(12) United States Patent
Nanba

(10) Patent No.: US 8,314,996 B2
(45) Date of Patent: Nov. 20, 2012

(54) ZOOM LENS AND IMAGE PICKUP APPARATUS INCLUDING THE SAME

(75) Inventor: Norihiro Nanba, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 76 days.

(21) Appl. No.: 12/940,278

(22) Filed: Nov. 5, 2010

(65) Prior Publication Data

US 2011/0157717 A1    Jun. 30, 2011

(30) Foreign Application Priority Data

Dec. 25, 2009    (JP) .................................. 2009-294302

(51) Int. Cl.
    *G02B 15/14*    (2006.01)
(52) U.S. Cl. ........................................ 359/686; 359/687
(58) Field of Classification Search .................. 359/686, 359/687

See application file for complete search history.

(56) References Cited

U.S. PATENT DOCUMENTS

| | | | |
|---|---|---|---|
| 7,177,092 B2 | 2/2007 | Satori et al. | |
| 7,286,304 B1 | 10/2007 | Ohtake | |
| 7,738,181 B2 | 6/2010 | Sato | |
| 7,965,452 B2 * | 6/2011 | Li et al. | 359/687 |
| 2007/0291375 A1 | 12/2007 | Ohtake et al. | |

FOREIGN PATENT DOCUMENTS

CN    101144899 A    3/2008

OTHER PUBLICATIONS

Notification of the First Office Action for corresponding CN 201010597795.0. Notification date Mar. 16, 2012. English translation provided.

* cited by examiner

*Primary Examiner* — William Choi
(74) *Attorney, Agent, or Firm* — Rossi, Kimms & McDowell LLP

(57) ABSTRACT

Provided is a zoom lens including, in order from an object side to an image side: a positive first lens unit having two positive lenses and a negative lens; a negative second lens unit having positive and negative lenses; a positive third lens unit; and a rear group including lens unit, wherein: with respect to a wide angle end, at a telephoto end, intervals between the first and second lens units, the second and third lens units, and the third lens unit and the rear group respectively change; and a focal length and an Abbe number of a material of the positive lens of the first lens unit that has a largest Abbe number among positive lenses, a refractive index and an Abbe number of a material of the positive lens of the second lens unit, and a focal length of the first lens unit are set appropriately.

13 Claims, 11 Drawing Sheets

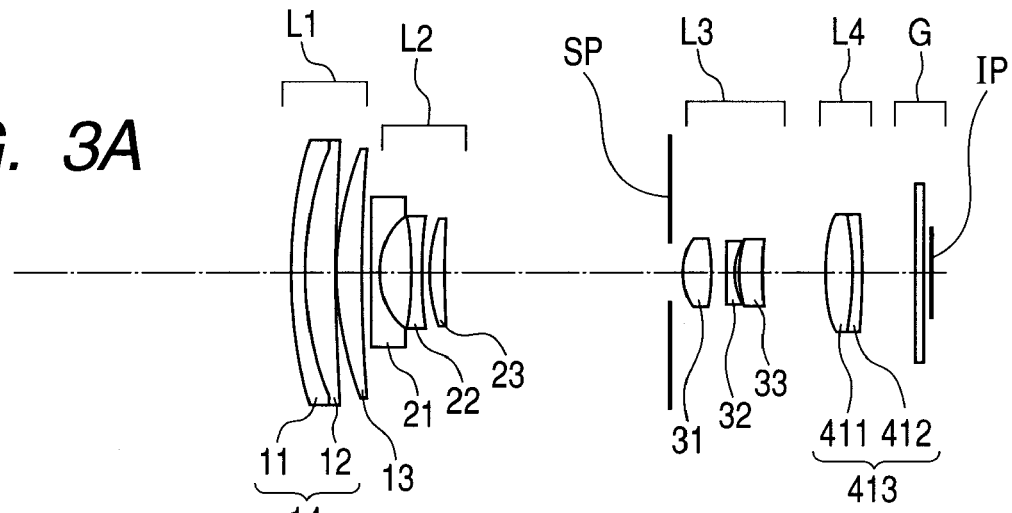
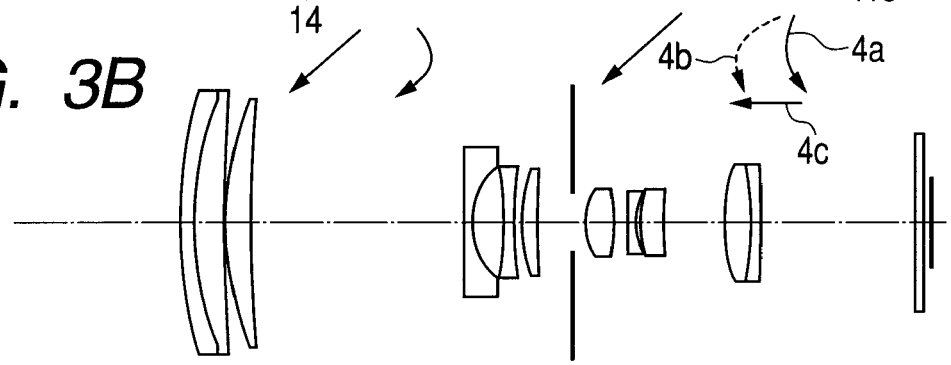
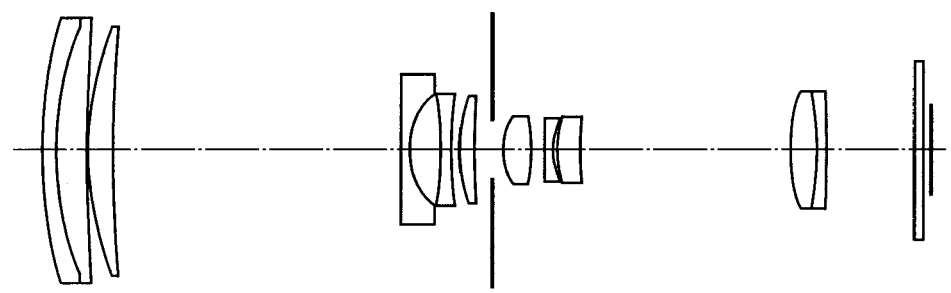

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for an image pickup apparatus using a solid-state image pickup element, such as a video camera, an electronic still camera, a broadcasting camera, or a monitor camera, or an image pickup apparatus such as a silver-halide film camera.

2. Description of the Related Art

In recent years, an image pickup apparatus using a solid-state image pickup element, such as a video camera, a digital still camera, a broadcasting camera, or a monitor camera, as well as a silver-halide film camera is downsized as the entire apparatus. Then, an image taking optical system used for the image pickup apparatus is required to be a high-resolution zoom lens having a short total lens length, a compact (small) size, and a high zoom ratio (high magnification ratio). As a zoom lens which meets the requirements, there is known a positive-lead type zoom lens having a lens unit including, in order from an object side to an image side, a first lens unit having a positive refractive power, a second lens unit having a negative refractive power, a third lens unit having the positive refractive power, and a rear group including at least one lens unit following those units. As the positive-lead type zoom lens, there is known a zoom lens constituted of four lens units having positive, negative, positive, and positive refractive powers, in order from the object side to the image side.

In U.S. Pat. No. 7,738,181, a low-dispersion material is used for a positive lens of a first lens unit, so as to perform appropriate correction of chromatic aberration at a telephoto side. In addition, there is known a zoom lens constituted of five lens units having, in order from an object side to an image side, positive, negative, positive, positive, and positive refractive powers (U.S. Pat. No. 7,286,304). In addition, there is known a zoom lens constituted of five lens units including, in order from an object side to an image side, positive, negative, positive, negative, and positive refractive power. U.S. Pat. No. 7,177,092 discloses a zoom lens having a zoom ratio of approximately 10.

In general, in order to obtain a zoom lens having a downsized entire system while having a predetermined zoom ratio, a refractive power (optical power=reciprocal of a focal length) of each lens unit constituting the zoom lens needs to be enhanced to reduce the number of lenses. However, such a zoom lens has large aberration variation accompanying zooming, and it is difficult to obtain high optical performance over the entire zoom range. In particular, the effective front lens diameter becomes large and downsizing of the entire lens system becomes insufficient. At the same time, it is difficult to correct various aberrations such as chromatic aberration at a telephoto end.

In order to obtain a high zoom ratio and downsize the entire lens system while obtaining good optical performance in the four-unit zoom lens or the five-unit zoom lens described above, it is important to appropriately set refractive power and lens configuration of each lens unit and a move condition of each lens unit in zooming. In particular, it is important to appropriately set lens configurations of the first and second lens units and move conditions of the first and third lens units in zooming. Unless those structures are set appropriately, it is difficult to obtain a zoom lens having a small entire system, a high zoom ratio, and high optical performance.

SUMMARY OF THE INVENTION

It is an object of the present invention to provide a zoom lens having a small entire optical system, a high zoom ratio, and high optical performance over an entire zoom range, and to provide an image pickup apparatus including the zoom lens.

A zoom lens according to the present invention includes, in order from an object side to an image side; a first lens unit having a positive refractive power, a second lens unit having a negative refractive power, a third lens unit having the positive refractive power, and a rear group including at least one lens unit, in which; with respect to a wide angle end, at a telephoto end, an interval between the first lens unit and the second lens unit increases, an interval between the second lens unit and the third lens unit decreases, and an interval between the third lens unit and the rear group changes, the first lens unit includes two positive lenses and one negative lens, and the second lens unit includes a negative lens and a positive lens, and the following conditional expressions are satisfied:

$$80.0 < v1p;$$

$$1.0 < f1p/f1 < 1.6;$$

$$v2p < 18.4; \text{ and}$$

$$1.90 < N2p,$$

where v1p denotes an Abbe number of a material of one of the two positive lenses constituting the first lens unit that has a largest Abbe number, N2p and v2p denote a refractive index and an Abbe number of a material of the positive lens of the second lens unit, respectively, f1 denotes a focal length of the first lens unit, and ftp denotes a focal length of the one of the two positive lenses constituting the first lens unit that has the largest Abbe number.

According to the present invention, there is obtained a zoom lens having a small entire optical system, a high zoom ratio, and high optical performance over an entire zoom range.

Further features of the present invention will become apparent from the following description of exemplary embodiments with reference to the attached drawings.

BRIEF DESCRIPTION OF THE DRAWINGS

FIGS. 3A, 3B, and 3C illustrate lens cross sections at a wide angle end, at an intermediate zoom position, and at a telephoto end, respectively, according to Numerical Embodiment 2 of the present invention.

DESCRIPTION OF THE EMBODIMENTS

Hereinafter, preferred embodiments of the present invention are described in detail with reference to the attached drawings. A zoom lens according to the present invention includes, in order from an object side to an image side, a first lens unit having a positive refractive power, a second lens unit having a negative refractive power, a third lens unit having the positive refractive power, and a rear group including at least one lens unit. During zooming, with respect to a wide angle end, at a telephoto end, an interval between the first lens unit and the second lens unit increases, an interval between the second lens unit and the third lens unit decreases, and an interval between the third lens unit and the rear group changes.

Figure 1A:
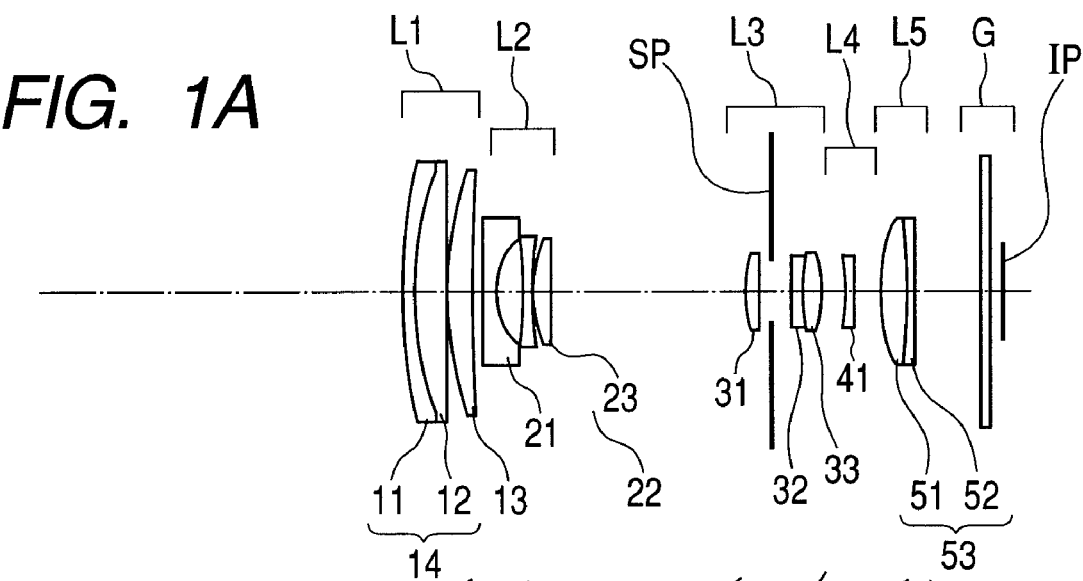
FIGS. 1A, 1B, and 1C illustrate lens cross sections at a wide angle end, at an intermediate zoom position, and at a telephoto end, respectively, according to Numerical Embodiment 1 of the present invention.
Figure 1B:
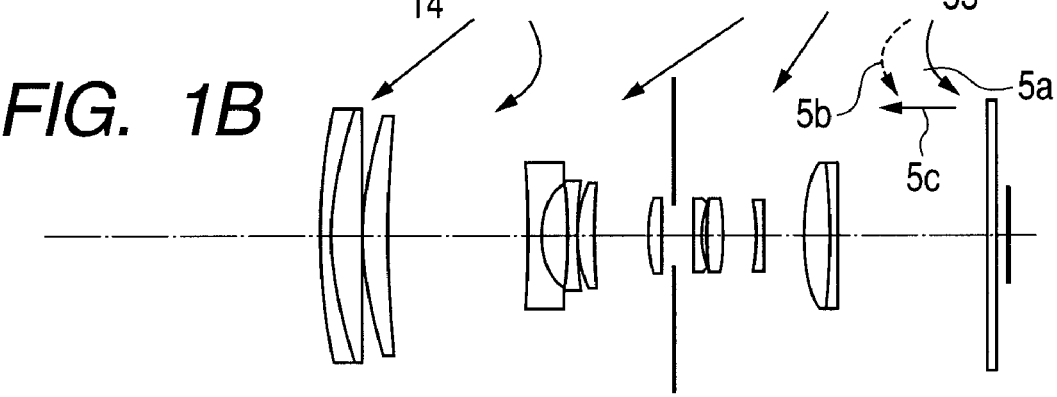
Figure 1C:
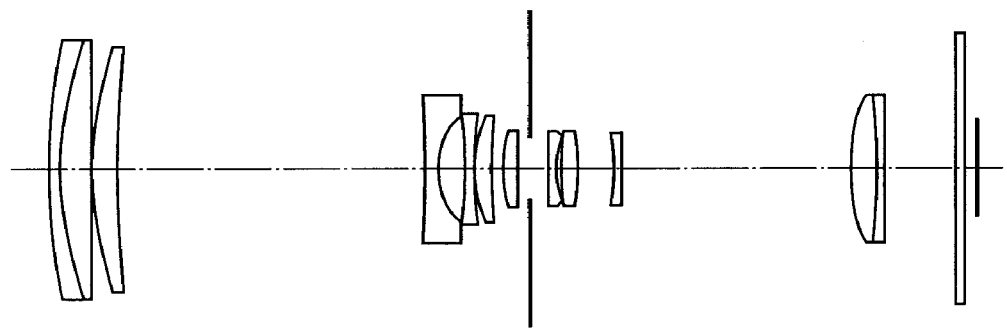
Figure 2A:
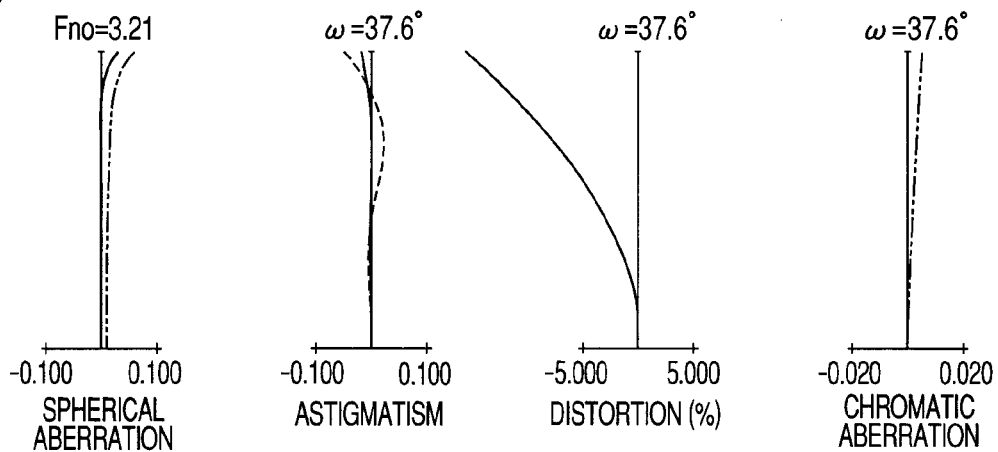
FIGS. 2A, 2B, and 2C are aberration diagrams at the wide angle end, at the intermediate zoom position, and at the telephoto end, respectively, according to Numerical Embodiment 1 of the present invention.
Figure 2B:
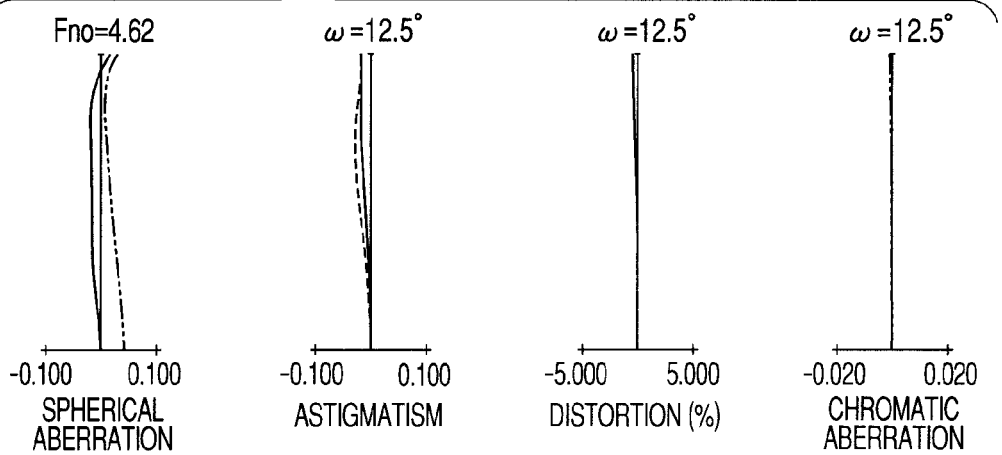
Figure 2C:
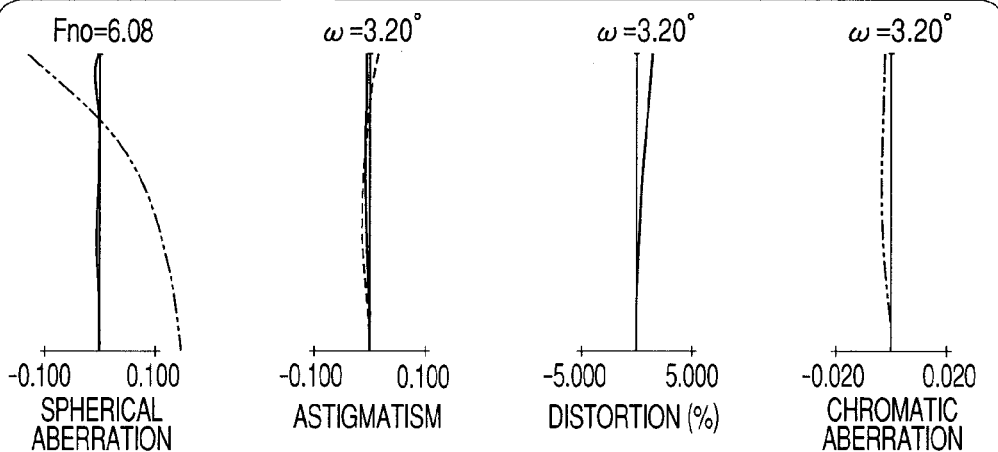

FIGS. 1A, 1B, and 1C illustrate lens cross sections at a wide angle end (short focal length end), at an intermediate zoom position, and at a telephoto end (long focal length end) of a zoom lens according to a first embodiment of the present invention. FIGS. 2A, 2B, and 2C are aberration diagrams at the wide angle end, at the intermediate zoom position, and at the telephoto end, respectively, of the zoom lens of the first embodiment. The zoom lens of the first embodiment has a zoom ratio of 13.32 and an aperture ratio of 3.21 to 6.08.

Figure 4A:
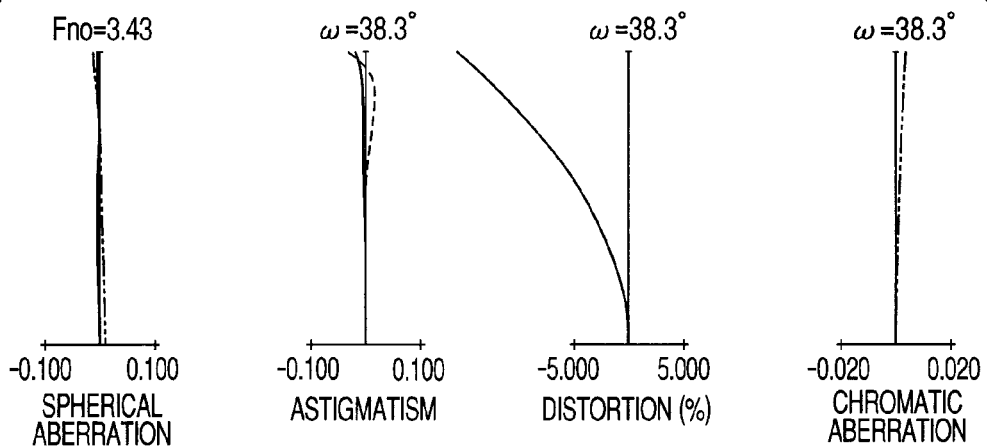
FIGS. 4A, 4B, and 4C are aberration diagrams at the wide angle end, at the intermediate zoom position, and at the telephoto end, respectively, according to Numerical Embodiment 2 of the present invention.
Figure 4B:
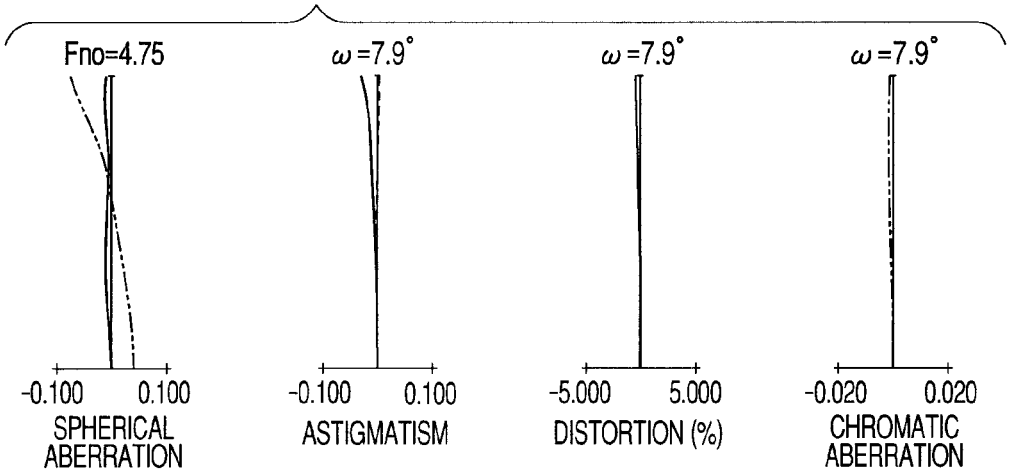
Figure 4C:
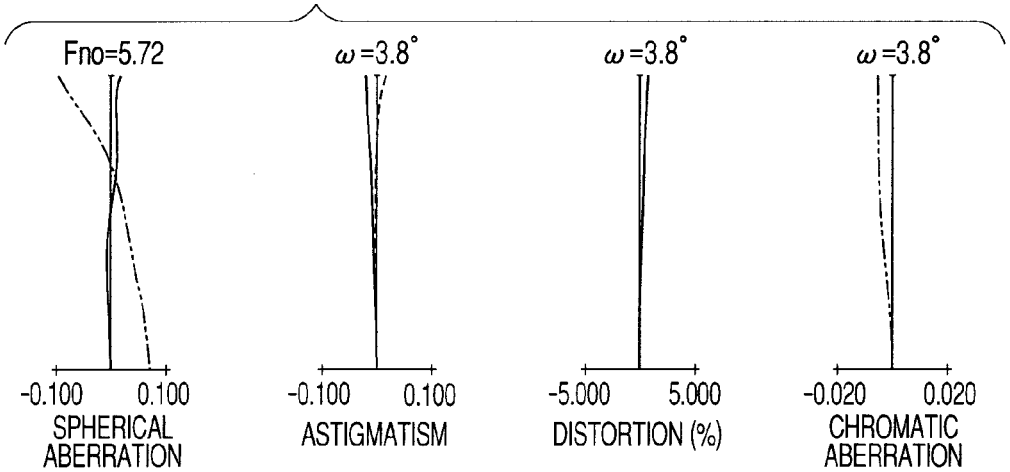

FIGS. 3A, 3B, and 3C illustrate lens cross sections at a wide angle end, at an intermediate zoom position, and at a telephoto end of a zoom lens according to a second embodiment of the present invention. FIGS. 4A, 4B, and 4C are aberration diagrams at the wide angle end, at the intermediate zoom position, and at the telephoto end, respectively, of the zoom lens of the second embodiment. The zoom lens of the second embodiment has a zoom ratio of 11.41 and an aperture ratio of 3.43 to 5.72.

Figure 5A:
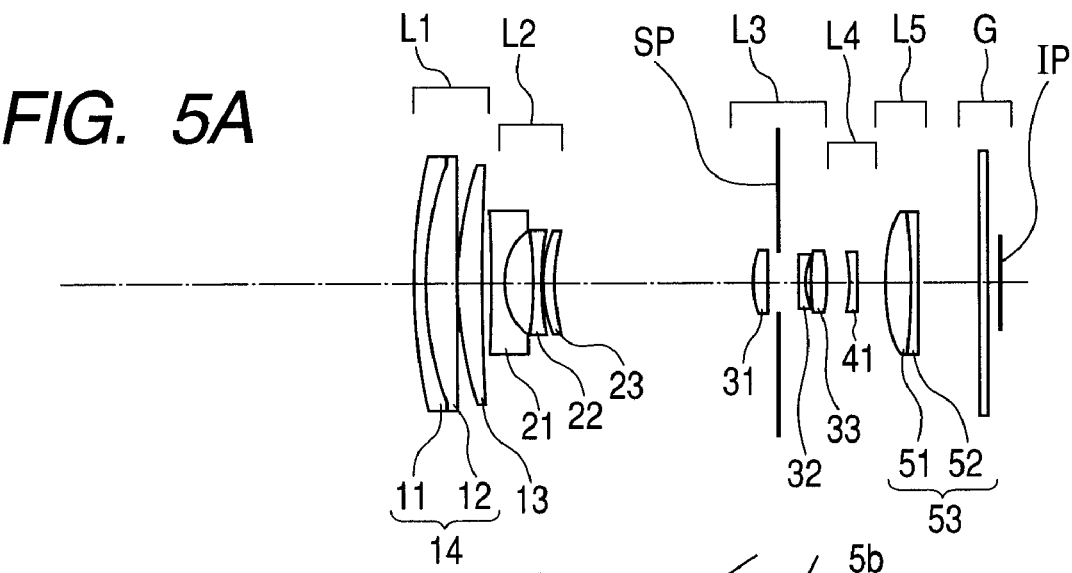
FIGS. 5A, 5B, and 5C illustrate lens cross sections at a wide angle end, at an intermediate zoom position, and at a telephoto end, respectively, according to Numerical Embodiment 3 of the present invention.
Figure 5B:
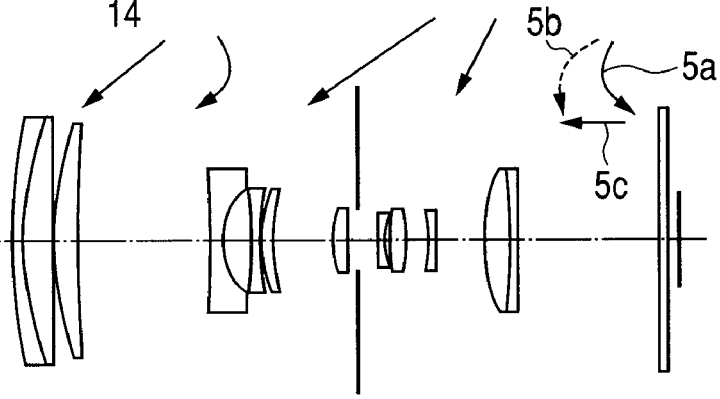
Figure 5C:
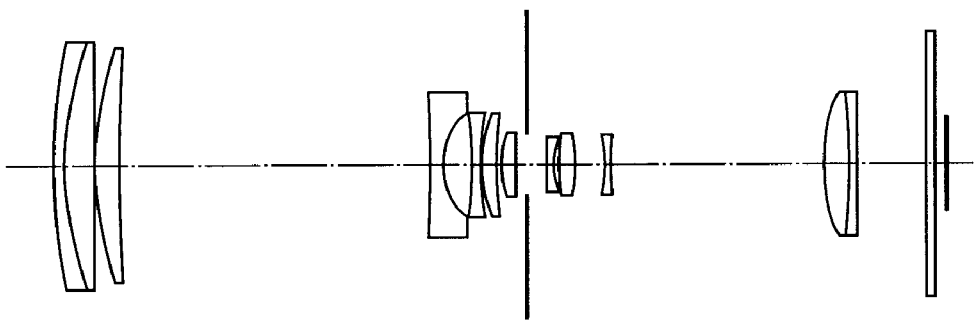
Figure 6A:
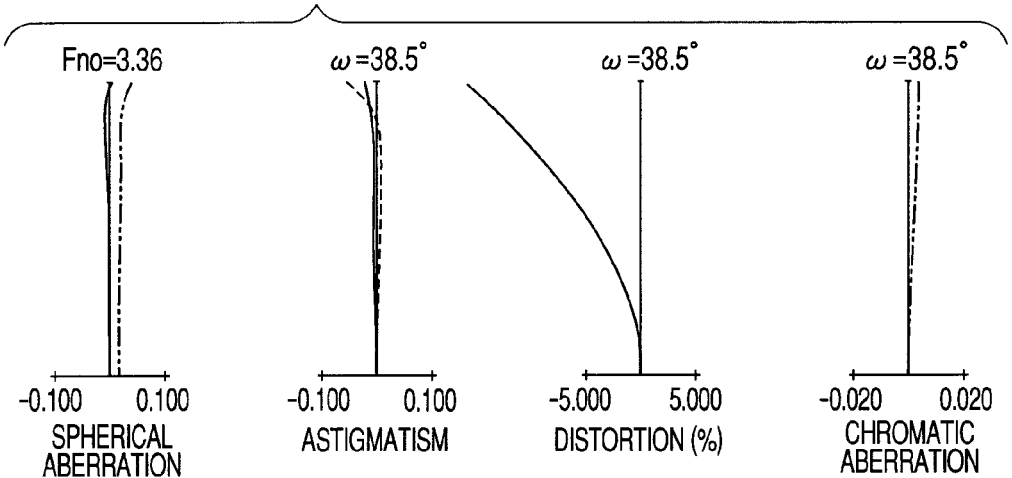
FIGS. 6A, 6B, and 6C are aberration diagrams at the wide angle end, at the intermediate zoom position, and at the telephoto end, respectively, according to Numerical Embodiment 3 of the present invention.
Figure 6B:
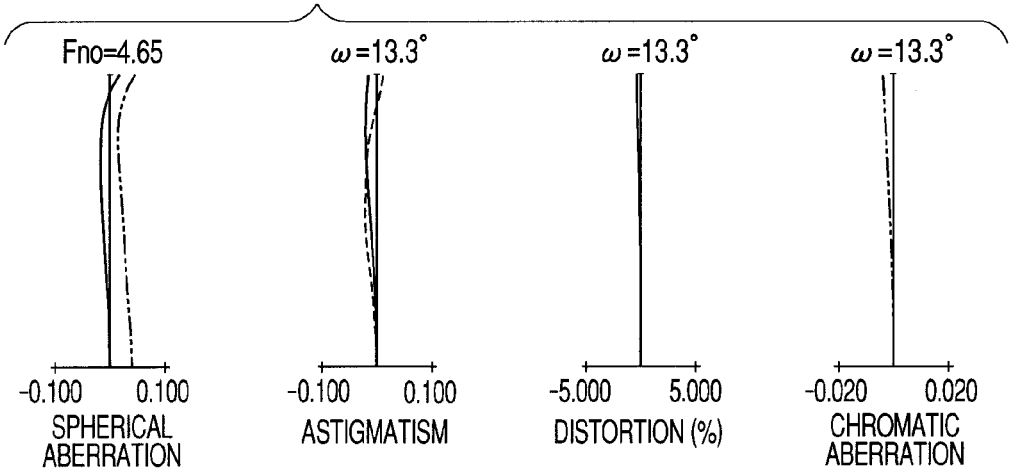
Figure 6C:
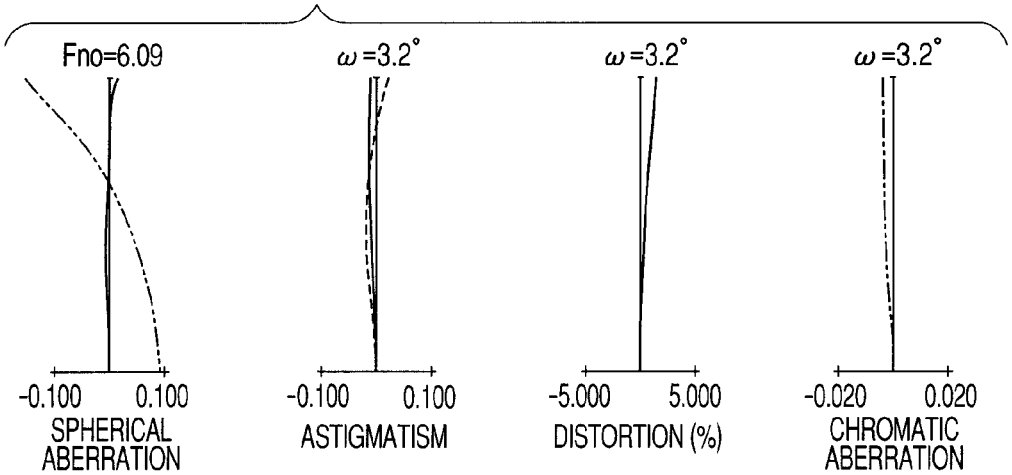

FIGS. 5A, 5B, and 5C illustrate lens cross sections at a wide angle end, at an intermediate zoom position, and at a telephoto end of a zoom lens according to a third embodiment of the present invention. FIGS. 6A, 6B, and 6C are aberration diagrams at the wide angle end, at the intermediate zoom position, and at the telephoto end, respectively, of the zoom lens of the third embodiment. The zoom lens of the third embodiment has a zoom ratio of 13.82 and an aperture ratio of 3.36 to 6.09.

Figure 7A:
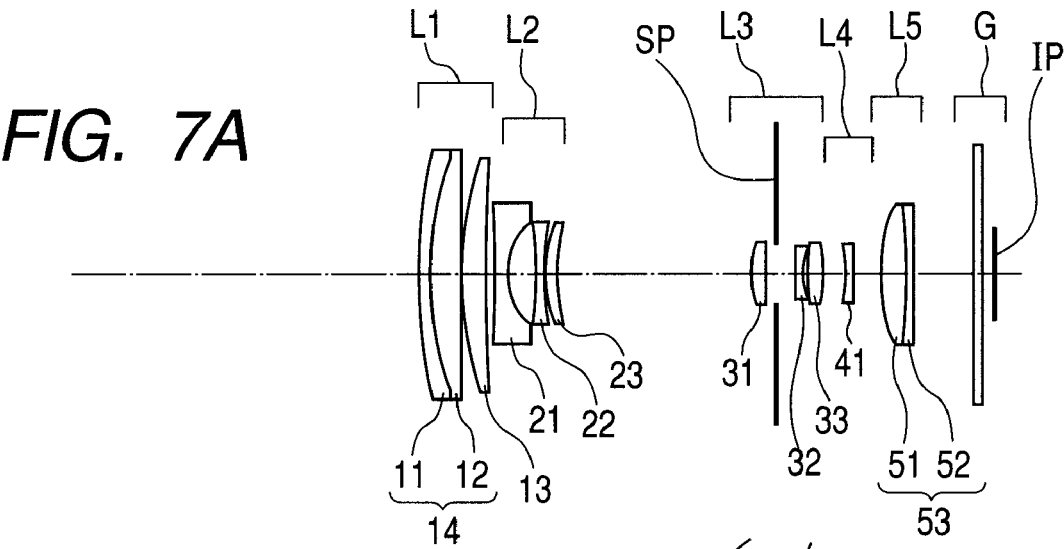
FIGS. 7A, 7B, and 7C illustrate lens cross sections at a wide angle end, at an intermediate zoom position, and at a telephoto end, respectively, according to Numerical Embodiment 4 of the present invention.
Figure 7B:
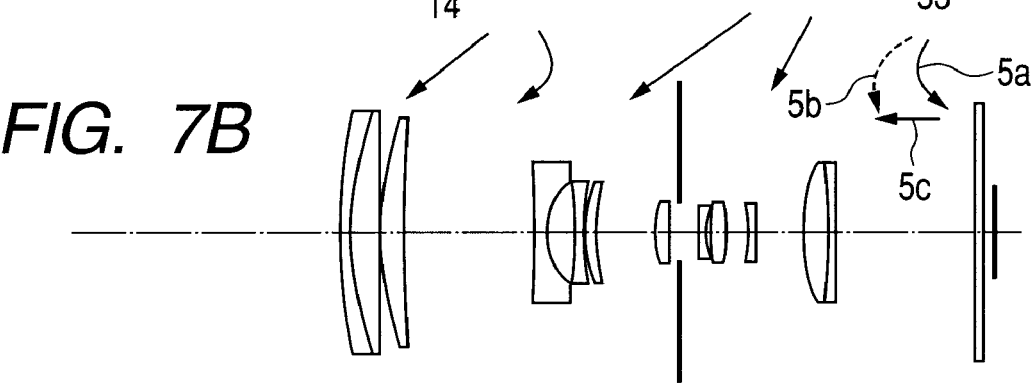
Figure 7C:
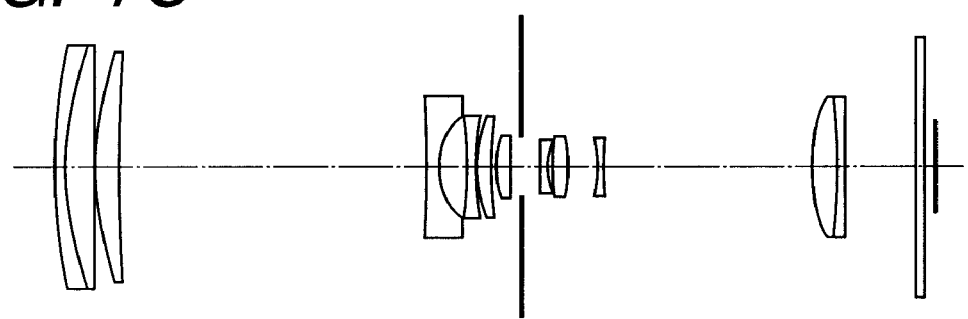
Figure 8A:
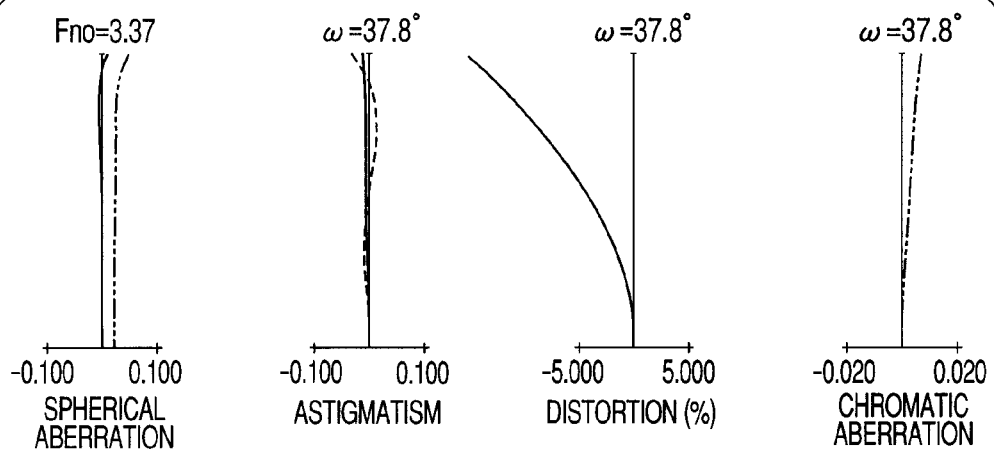
FIGS. 8A, 8B, and 8C are aberration diagrams at the wide angle end, at the intermediate zoom position, and at the telephoto end, respectively, according to Numerical Embodiment 4 of the present invention.
Figure 8B:
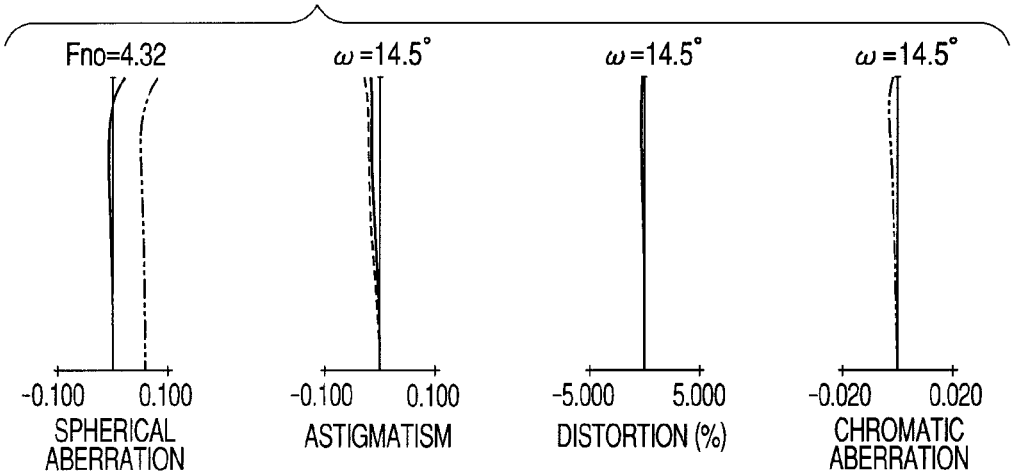
Figure 8C:
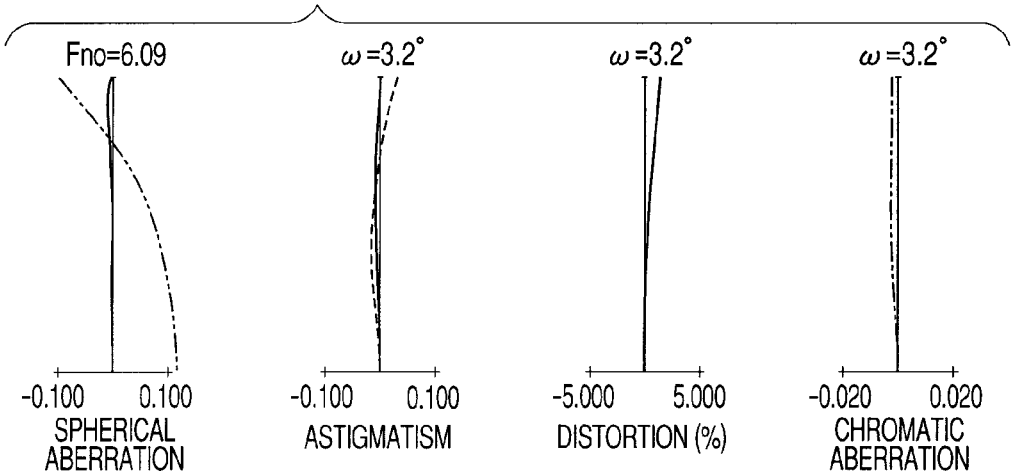

FIGS. 7A, 7B, and 7C illustrate lens cross sections at a wide angle end, at an intermediate zoom position, and at a telephoto end of a zoom lens according to a fourth embodiment of the present invention. FIGS. 8A, 8B, and 8C are aberration diagrams at the wide angle end, at the intermediate zoom position, and at the telephoto end, respectively, of the zoom lens of the fourth embodiment. The zoom lens of the fourth embodiment has a zoom ratio of 13.54 and an aperture ratio of 3.37 to 6.09.

Figure 9A:
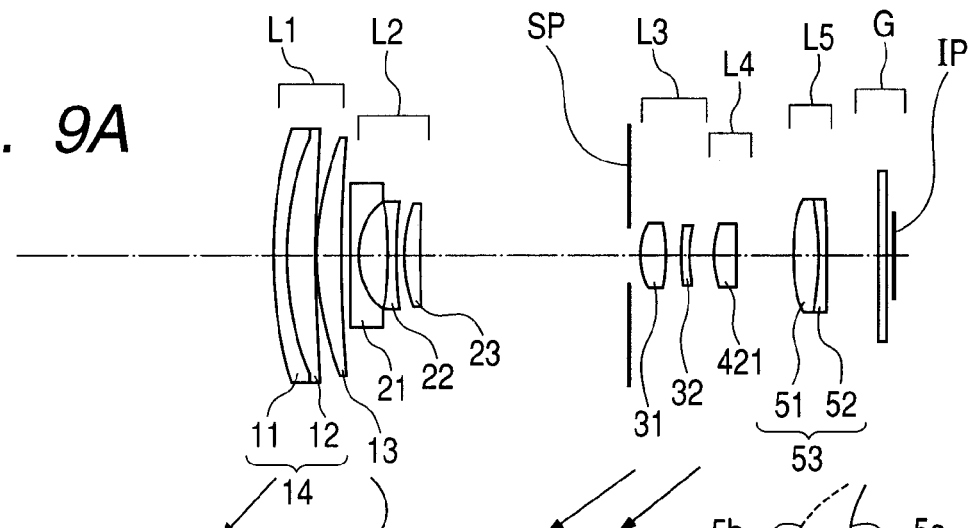
FIGS. 9A, 9B, and 9C illustrate lens cross sections at a wide angle end, at an intermediate zoom position, and at a telephoto end, respectively, according to Numerical Embodiment 5 of the present invention.
Figure 9B:
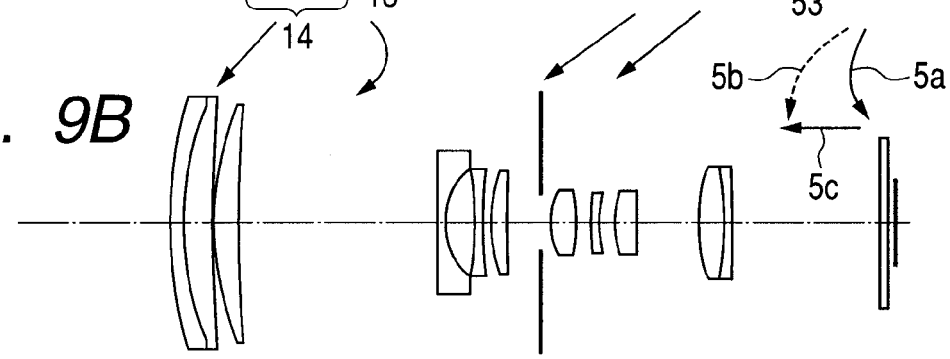
Figure 9C:
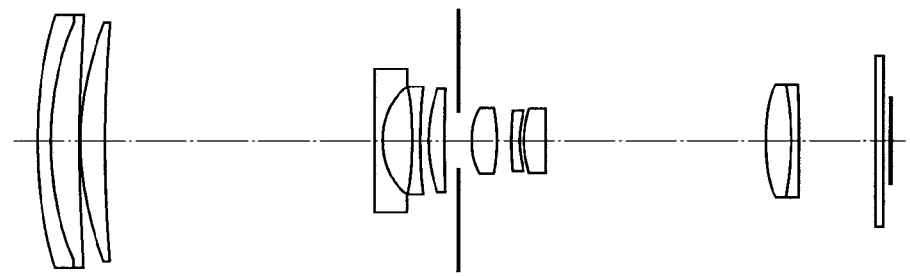
Figure 10A:
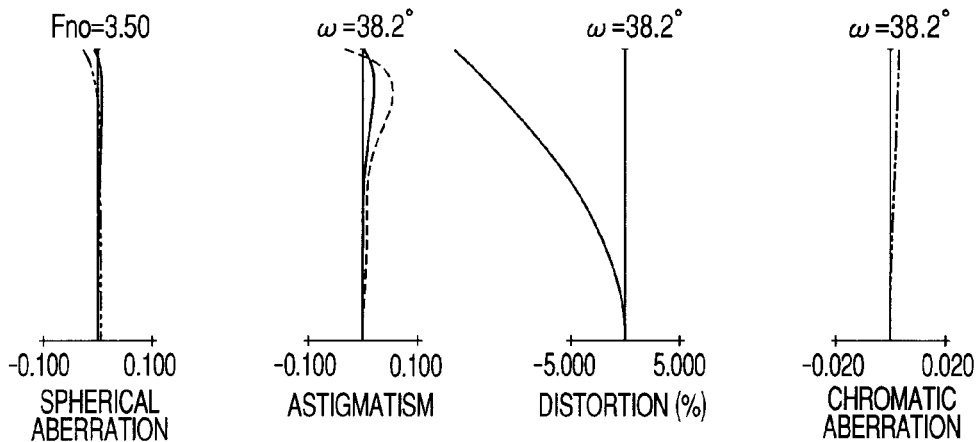
FIGS. 10A, 10B, and 10C are aberration diagrams at the wide angle end, at the intermediate zoom position, and at the telephoto end, respectively, according to Numerical Embodiment 5 of the present invention.
Figure 10B:
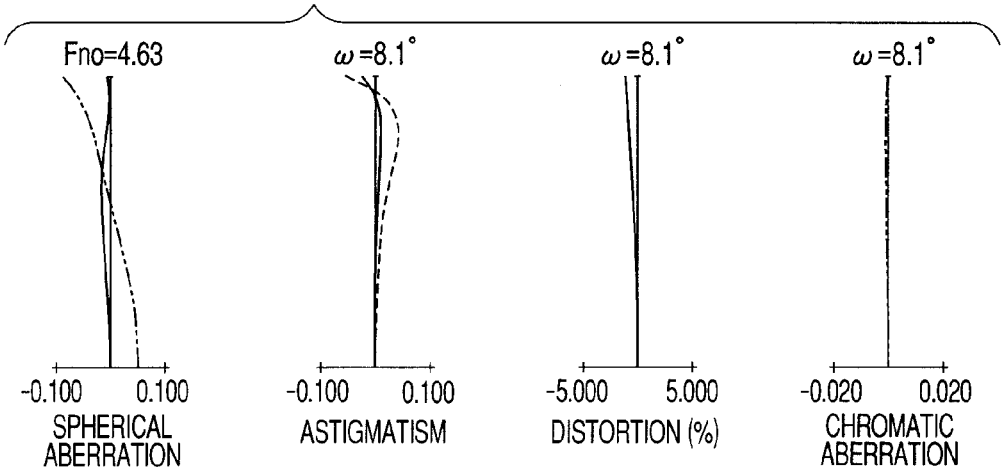
Figure 10C:
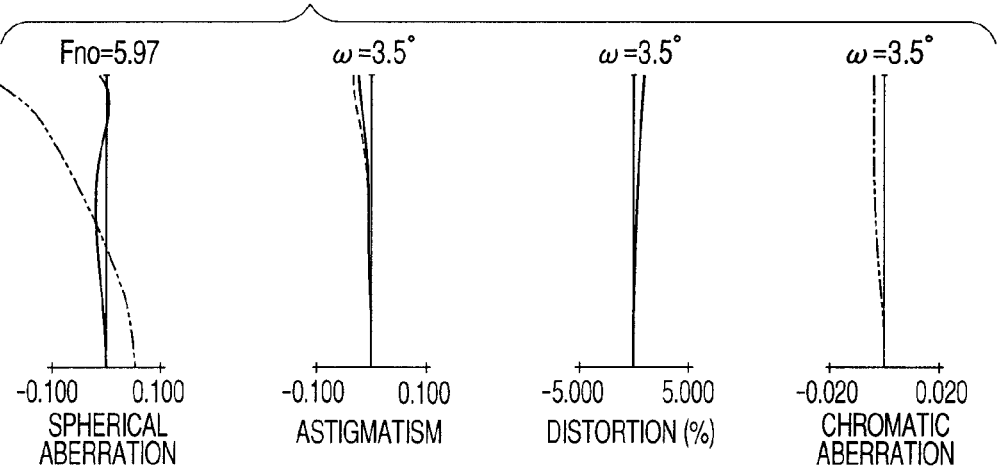

FIGS. 9A, 9B, and 9C illustrate lens cross sections at a wide angle end, at an intermediate zoom position, and at a telephoto end of a zoom lens according to a fifth embodiment of the present invention. FIGS. 10A, 10B, and 10C are aberration diagrams at the wide angle end, at the intermediate zoom position, and at the telephoto end, respectively, of the zoom lens of the fifth embodiment. The zoom lens of the fifth embodiment has a zoom ratio of 12.27 and an aperture ratio of 3.50 to 5.97.

Figure 11:
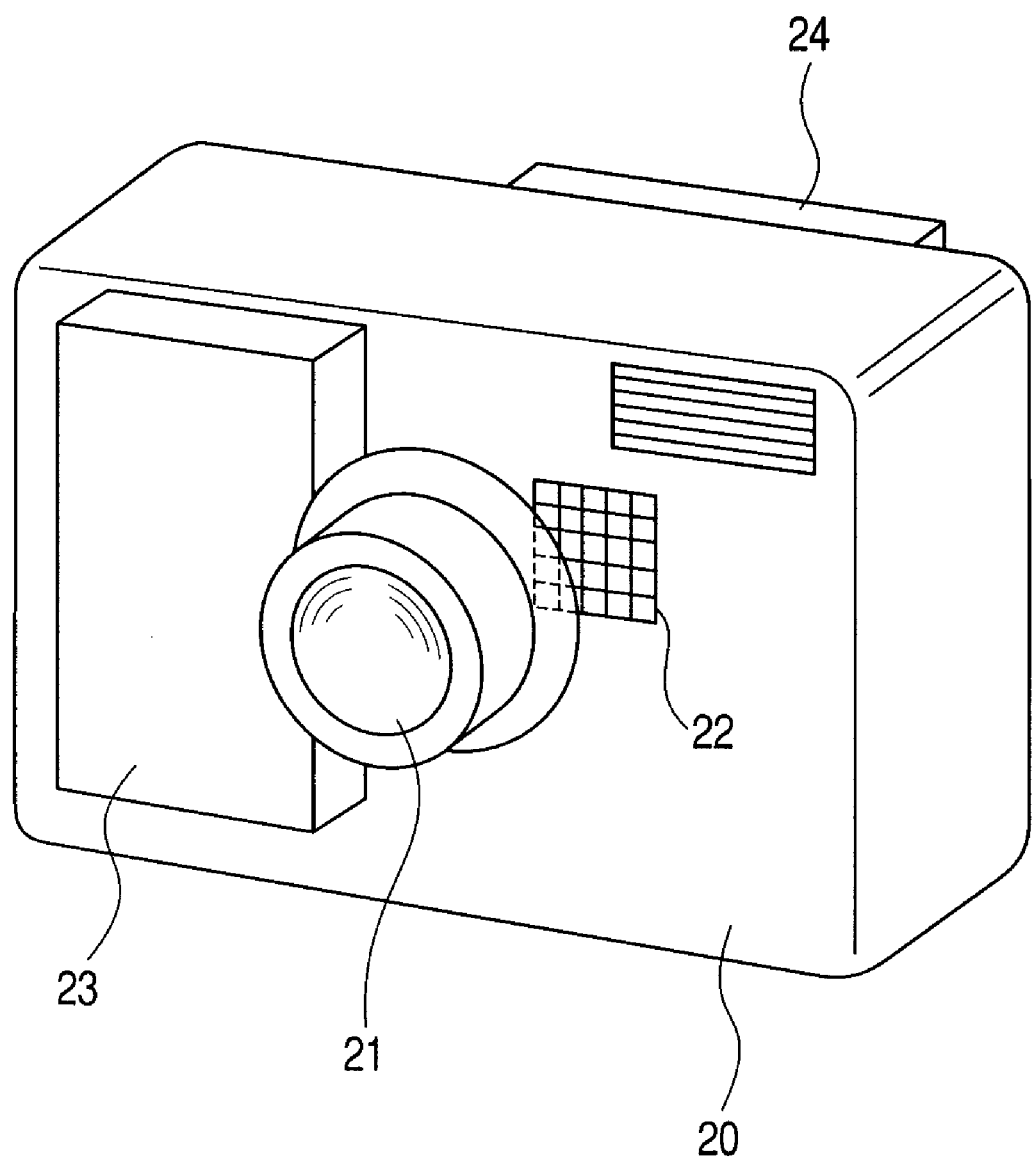
FIG. 11 is a schematic view illustrating a main portion of an image pickup apparatus of the present invention.

FIG. 11 is a schematic view illustrating a main portion of a camera (image pickup apparatus) including the zoom lens of the present invention. The zoom lens of each embodiment is an image taking lens system that is used for an image pickup apparatus such as a video camera, a digital camera, and a silver-halide film camera. In the lens cross sections, the left side corresponds to an object side, while the right side corresponds to an image side. Further, i indicates an order of each lens unit from the object side to the image side, and Li represents an i-th lens unit. Lr represents a rear group including at least one lens unit.

In the lens cross sections of the first, third, and fourth embodiments illustrated in FIGS. 1A to 1C, 5A to 5C, and 7A to 7C, respectively, the zoom lens includes a first lens unit L1 having a positive refractive power (optical power=reciprocal of a focal length, a second lens unit L2 having a negative refractive power, a third lens unit L3 having the positive refractive power. The rear group Lr includes a fourth lens unit L4 having the negative refractive power, and a fifth lens unit L5 having the positive refractive power. Each of the first, third, and fourth embodiments describes a positive-lead type five-unit zoom lens.

In the lens cross sections of the second embodiment illustrated in FIGS. 3A to 3C, the zoom lens includes a first lens unit L1 having a positive refractive power, a second lens unit L2 having a negative refractive power, and a third lens unit L3 having the positive refractive power. The rear group Lr includes a fourth lens unit L4 having the positive refractive power. The second embodiment describes a positive-lead type four-unit zoom lens.

In the lens cross section of the fifth embodiment illustrated in FIGS. 9A to 9C, the zoom lens includes a first lens unit L1 having a positive refractive power, a second lens unit L2 having a negative refractive power, and a third lens unit L3 having the positive refractive power. The rear group Lr includes a fourth lens unit L4 having the positive refractive power and a fifth lens unit L5 having positive refractive power. The fifth embodiment describes a positive lead type five-unit zoom lens. In each of the lens cross sections, an F number decision member (hereinafter referred to as an "aperture stop") SP has a function of aperture stop for deciding (limiting) an open F number (Fno) light flux.

An optical block G corresponds to an optical filter, a face plate, a quartz low-pass filter, an infrared cut filter, or the like. As an image plane IP, an imaging plane of a solid-state image pickup element (photoelectric transducer) such as a CCD sensor or a CMOS sensor is disposed when the zoom lens is used as an image taking optical system such as a video camera or a digital still camera. Alternatively, a photosensitive surface corresponding to a film surface is disposed when the zoom lens is used as an image taking optical system of a silver-halide film camera. In the spherical aberration diagram, a solid line indicates a d-line, and a dashed-double-dotted line indicates a g-line. In the astigmatism diagram, a dot line indicates a meridional image plane, a solid line indicates a sagittal image plane, and lateral chromatic aberration is shown by the g-line. A half field angle (a half value of an image taking field angle) is denoted by ω, and an F number is denoted by Fno. Note that in the following embodiments, the wide angle end and the telephoto end mean zoom positions where the lens unit for zooming is positioned at each end of mechanically movable range on the optical axis. In each embodiment, an arrow indicates a moving locus during zooming from the wide angle end to the telephoto end or during focusing.

In the zoom lens of each embodiment, refractive powers of the first lens unit L1 and the second lens unit L2 are enhanced to a certain extent so that a distance between the first lens unit L1 and the aperture stop SP is reduced at the wide angle end. Thus, a lens diameter of the first lens unit L1 is reduced (shortened). In addition, the refractive power of the third lens unit L3 is enhanced to a certain extent so that a distance between the aperture stop SP and the image plane IP is reduced. Thus, a total lens length at the wide angle end (distance between the first lens surface and the image plane) is shortened.

In the zoom lens of each embodiment, when zooming from the wide angle end to the telephoto end is performed, the first lens unit L1 is moved to the object side so that the interval between the first lens unit L1 and the second lens unit L2 becomes longer (larger) at the telephoto end than at the wide angle end, to thereby obtain the zooming action. Further, when zooming from the wide angle end to the telephoto end is performed, the third lens unit L3 is moved to the object side so that the interval between the second lens unit L2 and the third lens unit L3 becomes shorter (smaller) at the telephoto end than at the wide angle end, to thereby obtain the zooming action.

In this way, by sharing the zooming action among multiple areas (lens units), a movement stroke of each lens unit in zooming can be shortened while realizing higher zoom ratio, as well as shortening the total lens length at the telephoto end. A focus variation in zooming is corrected by moving the lens unit disposed closest to the image side along a locus convex toward the object side. As to focusing, the first lens unit L1 or the lens unit disposed closest to the image side is moved to the object side so that focusing from an infinite object to a near object is performed.

In the five-unit zoom lens illustrated in FIGS. 1A to 1C, 5A to 5C, 7A to 7C, and 9A to 9C, in order to perform focusing from an infinite object to a near object at the telephoto end, the fifth lens unit L5 is moved forward as illustrated in each lens cross section by the arrow 5c. The solid line curve 5a and the dot line curve 5b concerning the fifth lens unit L5 indicate moving loci for correcting image plane variation accompanying zooming from the wide angle end to the telephoto end when focusing on an infinite object and on a near object, respectively.

In the second embodiment illustrated in FIGS. 3A to 3C, in order to perform focusing on from an infinite object to a near object at the telephoto end, the fourth lens unit L4 is moved forward as illustrated in the lens cross section by the arrow 4c. The solid line curve 4a and the dot line curve 4b concerning the fourth lens unit L4 indicate moving loci for correcting image plane variation accompanying zooming from the wide angle end to the telephoto end when focusing on an infinite object and a near object, respectively.

In each embodiment, the first lens unit L1 includes two positive lenses and one negative lens. The second lens unit L2 includes a negative lens and a positive lens. Among the positive lenses included in the first lens unit L1, an Abbe number of a material of the positive lens G1p whose material has a largest Abbe number is denoted by ν1p. A refractive index and an Abbe number of a material of one positive lens G2p of the second lens unit L2 are denoted by N2p and ν2p, respectively. A focal length of the first lens unit L1 is denoted by f1, and a focal length of the positive lens G1p whose material has the largest Abbe number among the positive lenses of the first lens unit L1 is denoted by f1p. In this case, the following conditional expressions are satisfied.

$$80.0 < \nu 1p \quad (1)$$

$$1.0 < f1p/f1 < 1.6 \quad (2)$$

$$\nu 2p < 18.4 \quad (3)$$

$$1.90 < N2p \quad (4)$$

The conditional expression (1) is an expression defining an Abbe number of the material of the positive lens G1p whose material has the largest Abbe number among the positive lenses included in the first lens unit L1. If the Abbe number is too small and below the lower limit of the conditional expression (1), that is, if a dispersion is large, it becomes difficult to correct longitudinal chromatic aberration and lateral chromatic aberration appropriately on the telephoto side. A low-dispersion material having an Abbe number larger than 80 satisfying the conditional expression (1) tends to have a large partial dispersion ratio, so it also has an effect of correcting secondary spectrum appropriately on the telephoto side. In order to obtain this effect too, it is desirable not to fall below the lower limit of the conditional expression (1).

The conditional expression (2) is an expression defining a focal length of the positive lens G1p whose material has the largest Abbe number among the positive lenses of the first lens unit L1. If the focal length of the positive lens G1p is too large and above the upper limit of the conditional expression (2), that is, if the refractive power is too small, it becomes difficult to correct longitudinal chromatic aberration and lateral chromatic aberration appropriately on the telephoto side even if a low-dispersion material is used for the positive lens G1p. In addition, if the focal length of the positive lens G1p is too small and below the lower limit of the conditional expression (2), that is, if the refractive power is too large, large spherical aberration is generated on the telephoto side of the positive lens G1p, which is undesirable.

The conditional expression (3) is an expression defining an Abbe number of one positive lens G2p included in the second lens unit L2. Above the upper limit, that is, if the dispersion is small, a sufficient difference in Abbe number with a material of the negative lens of the second lens unit L2 cannot be secured, and hence the refractive power of each lens necessary for achromatization is increased. As a result, the size of the second lens unit L2 is increased. In addition, large distortion and field curvature are generated on the wide angle side, and large spherical aberration is generated on the telephoto side, which is undesirable.

The conditional expression (4) is an expression defining a refractive index of a material of one positive lens G2p included in the second lens unit L2. If the refractive index is too small and below the lower limit, a lens surface curvature becomes steep in order to obtain a desired refractive power.

Therefore, the lens thickness is increased inappropriately. In addition, the Petzval sum becomes too large in the positive direction so that large field curvature is generated inappropriately. In order to achieve downsizing of the second lens unit L2 and appropriate correction of various aberrations, it is preferred to satisfy both the conditional expressions (3) and (4). In each embodiment, it is particularly preferred to set the numeric values of the conditional expressions (1) to (4) as follows.

$$81.0 < v1p \tag{1a}$$

$$1.000 < f1p/f1 < 1.595 \tag{2a}$$

$$v2p < 18.2 \tag{3a}$$

$$1.92 < N2p \tag{4a}$$

As described above, according to each embodiment, it is possible to obtain a zoom lens having a high zoom ratio of approximately 12 or larger, in which downsizing of the front lens effective diameter is facilitated, and chromatic aberration is corrected appropriately on the telephoto side. In each embodiment, it is more preferred to satisfy one or more of the following conditions.

Movement amounts of the first lens unit L1 and the third lens unit L3 during zooming from the wide angle end to the telephoto end are denoted by M1 and M3, respectively. A focal length of the entire system of the zoom lens at the wide angle end is denoted by fw. Focal lengths of the second lens unit L2 and the third lens unit L3 are denoted by f2 and f3, respectively. A difference of refractive index between materials of two positive lenses of the first lens unit L1 is denoted by ΔN1p. The second lens unit L2 includes, in order from the object side to the image side, a negative lens having a concave surface facing the image side, and a positive lens having a convex surface facing the object side, in which the absolute value of refractive power of the lens surface on the image side is larger than that on the object side. Then, a distance between a lens surface of the negative lens on the image side and a lens surface of the positive lens on the object side on the optical axis is denoted by d2. An Abbe number of a material of a negative lens having the largest absolute value of refractive power included in the second lens unit L2 is denoted by v2n. In this case, it is preferred to satisfy one or more of the following conditions:

$$-7.0 < M1/fw < -3.5 \tag{5}$$

$$-4.0 < M3/fw < -2.7 \tag{6}$$

$$7.0 < f1/fw < 10.0 \tag{7}$$

$$1.2 < |f2|/fw < 1.6 \tag{8}$$

$$1.7 < f3/fw < 4.6 \tag{9}$$

$$0.1 < \Delta N1p < 0.4 \tag{10}$$

$$0.52 < d2/fw < 1.00 \tag{11}$$

$$0.029 < (1/v2p - 1/v2n) < 0.050 \tag{12}$$

where the movement amounts M1 and M3 are positional differences of the lens units with respect to the image plane in the optical axis direction at the telephoto end compared with the wide angle end. The sign is negative when positioned on the object side, while the sign is positive when positioned on the image side.

Next, technical meanings of the above-mentioned conditional expressions are described. The conditional expression (5) is an expression defining a movement amount of the first lens unit L1 accompanying zooming. If the movement amount toward the object side during zooming is too small and above the upper limit of the conditional expression (5), the zooming effect is weakened. If the refractive power of the first lens unit L1 is enhanced so as to compensate for the zooming effect, large spherical aberration is generated on the telephoto side. In addition, if the refractive power of the second lens unit L2 is enhanced so as to compensate for the zooming effect, large field curvature is generated on the wide angle side, and large spherical aberration is generated on the telephoto side. If the movement amount toward the object side during zooming is too large and below the lower limit of the conditional expression (5), the total lens length increases at the telephoto end, and hence it becomes difficult to downsize the entire system of the zoom lens.

The conditional expression (6) is an expression defining a movement amount of the third lens unit L3 during zooming. If a movement amount toward the object side during zooming is too small and above the upper limit of the conditional expression (6), the zooming effect is weakened. If the refractive power of the first lens unit L1 is enhanced so as to compensate for the zooming effect, large spherical aberration is generated on the telephoto side. In addition, if the refractive power of the second lens unit is enhanced so as to compensate for the zooming effect, large field curvature is generated on the wide angle side, and large spherical aberration is generated on the telephoto side. If the movement amount toward the object side is too large and below the lower limit of the conditional expression (6), a movement amount of the aperture stop SP that moves together with the third lens unit L3 is also increased. Thus, change of the open F number accompanying magnification increases, and hence the F number at the telephoto end becomes dark inappropriately. If a solid-state image pickup element having a small pixel pitch is used, the imaging lens is required to have high MTF at high frequency. If the open F number is dark, it is difficult to increase the MTF because of an influence of the diffraction, which is not appropriate.

The conditional expression (7) is an expression defining a focal length of the first lens unit L1, namely refractive power of the first lens unit L1. If the refractive power is too small and above the upper limit of the conditional expression (7), the zooming effect is weakened. If a movement amount of the first lens unit L1 during zooming is increased so as to compensate for the zooming effect, the total lens length increases at the telephoto end. In addition, if the refractive power of the third lens unit L3 is enhanced so as to compensate for the zooming effect, various aberrations such as spherical aberration, coma aberration, and longitudinal chromatic aberration are increased. If the number of lenses are increased for correcting the various aberrations, thickness of the lens unit increases so that downsizing becomes difficult. If the refractive power is too large and below the lower limit of the conditional expression (7), large spherical aberration is generated on the telephoto side of the first lens unit L1. If the number of lenses is increased for correcting the aberration, a size of the first lens unit increases, and hence the front lens diameter is increased inappropriately.

The conditional expression (8) is an expression defining a focal length of the second lens unit L2, namely refractive power of the second lens unit L2. If the refractive power is too small and above the upper limit of the conditional expression (8), the zooming effect of the second lens unit L2 is weakened, and hence it becomes difficult to obtain a desired magnification ratio. In addition, if the refractive power is too large and below the lower limit of the conditional expression (8), large field curvature is generated on the wide angle side of the second lens unit L2, and large spherical aberration is generated on the telephoto side of the second lens unit L2.

The conditional expression (9) is an expression defining a focal length of the third lens unit L3, namely refractive power of the third lens unit L3. If the refractive power is too small and above the upper limit of the conditional expression (9), the zooming effect of the third lens unit L3 is weakened, and hence it becomes difficult to obtain a desired magnification ratio. In addition, if the refractive power is too large and below the lower limit of the conditional expression (9), large spherical aberration, coma aberration, and longitudinal chromatic aberration are generated in the third lens unit L3.

The conditional expression (10) is an expression defining a difference of refractive index between materials of two positive lenses included in the first lens unit L1. A case where the difference of refractive index is too large and above the upper limit of the conditional expression (10) corresponds to a case where the refractive index of one positive lens is too large. In general, a material having high refractive index is a high-dispersion material with a small Abbe number. Therefore, above the upper limit, the dispersion becomes too high so that large longitudinal chromatic aberration and lateral chromatic aberration are generated on the telephoto side. In addition, in a case where the difference of refractive index is too small and below the lower limit of the conditional expression (10) corresponds to a case where both the two positive lenses have small refractive indices. If the refractive power of the first lens unit L1 is enhanced to some extent, large spherical aberration is generated on the telephoto side even if the refractive power is shared by the two positive lenses.

The conditional expression (11) is an expression defining a distance on the optical axis between the lens surface on the image side of the negative lens of the second lens unit L2 in which the concave surface faces the image side and the lens surface on the object side of the positive lens in which the convex surface faces the object side. The second lens unit L2 realizes a wide angle and downsizing by a retrofocus type refractive power arrangement in which a lens unit having negative refractive power comes first. This refractive power arrangement depends largely on the arrangement of the concave surface of the negative lens facing the image side and the convex surface of the positive lens facing the object side. By setting the refractive power of each lens surface to be rather strong with a distance set to be small to some extent, a wide angle and downsizing can be easily realized. If the interval is too large and above the upper limit of the conditional expression (11), thickness of the second lens unit L2 in the optical axis direction increases, and hence size of the second lens unit L2 increases inappropriately. If size of the second lens unit L2 increases, the interval between the first lens unit L1 and the aperture stop SP increases so that the front lens effective diameter increases. If the interval is too small and below the lower limit of the conditional expression (11), downsizing is facilitated, but the refractive power of each lens surface becomes too strong. As a result, large distortion aberration and field curvature are generated on the wide angle side, and large spherical aberration is generated on the telephoto side.

The conditional expression (12) is an expression defining a difference of the reciprocal of the Abbe number between materials of the positive lens G2$p$ and the negative lens G2$n$ having the largest absolute value of refractive power among negative lenses of the second lens unit L2. As the difference of the reciprocal of the Abbe number becomes larger, refractive power of each lens necessary for achromatization becomes smaller. The case where the difference of the reciprocal of the Abbe number is too large and above the upper limit of the conditional expression (12) is the case where dispersion of a material of the positive lens G2$p$ is too high. In general, a high-dispersion material has a large partial dispersion ratio. If the upper limit is exceeded, a partial dispersion ratio of a material of the positive lens G2$p$ is too large, and hence a secondary spectrum increases on the telephoto side. In addition, if the difference of the reciprocal of the Abbe number is too small and below the lower limit of the conditional expression (12), refractive power of each lens necessary for achromatization becomes too large. As a result, large distortion aberration and field curvature are generated on the wide angle side, and large spherical aberration is generated on the telephoto side.

In each embodiment, it is more preferred to set the numerical value ranges of the conditional expressions (5) to (12) as follows.

$$-6.5 < M1/fw < -4.0 \tag{5a}$$

$$-3.8 < M3/fw < -3.0 \tag{6a}$$

$$7.4 < f1/fw < 9.0 \tag{7a}$$

$$1.3 < |f2|/fw < 1.5 \tag{8a}$$

$$1.8 < f3/fw < 4.5 \tag{9a}$$

$$0.103 < \Delta N1p < 0.360 \tag{10a}$$

$$0.56 < d2/fw < 0.95 \tag{11a}$$

$$0.030 < (1/\nu 2p - 1/\nu 2n) < 0.045 \tag{12a}$$

Characteristics of the zoom lenses of the first to fifth embodiments are described. In the zoom lenses of the first, third, and fourth embodiments illustrated in FIGS. 1A to 1C, 5A to 5C, and 7A to 7C, respectively, intervals among the lens units are changed as follows during zooming from the wide angle end to the zoom position at the telephoto end. Specifically, the interval between the first lens unit L1 and the second lens unit L2 is increased, the interval between the second lens unit L2 and the third lens unit L3 is decreased, and the interval between the third lens unit L3 and the fourth lens unit L4 is changed. Further, the lens units move so that the interval between the fourth lens unit L4 and the fifth lens unit L5 is increased.

In the zoom lenses of the first, third, and fourth embodiments illustrated in FIGS. 1A to 1C, 5A to 5C, and 7A to 7C, respectively, the first lens unit L1, the third lens unit L3, and the fourth lens unit L4 are positioned closer to the object side at the telephoto end than at the wide angle end. In addition, the second lens unit L2 moves along a locus convex toward the image side, and the fifth lens unit L5 moves along a locus convex toward the object side. In the zoom lenses of the first, third, and fourth embodiments illustrated in FIGS. 1A to 1C, 5A to 5C, and 7A to 7C, respectively, the F number decision member SP is positioned in the third lens unit L3 in the optical axis direction. By disposing the aperture stop SP in this way, the interval between the second lens unit L2 and the third lens unit L3 can be reduced at the telephoto end. Therefore, it is possible to secure a sufficient change amount of the interval between the second lens unit L2 and the third lens unit L3 for zooming. Thus, a zoom lens having a high zoom ratio can be realized. Further, in the zoom lenses of the first, third, and fourth embodiments illustrated in FIGS. 1A to 1C, 5A to 5C, and 7A to 7C, respectively, the interval between the third lens unit L3 and the fourth lens unit L4 is set larger at the telephoto end than at the wide angle end, and hence higher zooming effect is obtained.

In the zoom lens of the second embodiment illustrated in FIGS. 3A to 3C, intervals among the lens units are changed as follows during zooming from the wide angle end to the zoom position at the telephoto end. Specifically, the lens units move so that the interval between the first lens unit L1 and the second lens unit L2 is increased, the interval between the second lens unit L2 and the third lens unit L3 is decreased, and the interval between the third lens unit and the fourth lens unit L4 is increased. In the zoom lens of the second embodiment illustrated in FIGS. 3A to 3C, the first lens unit L1 and the third lens unit L3 are positioned closer to the object side at the telephoto end than at the wide angle end. In addition, the second lens unit L2 moves along a locus convex toward the image side, and the fourth lens unit L4 moves along a locus convex toward the object side. In the zoom lens of the second embodiment illustrated in FIGS. 3A to 3C, the F number decision member SP is positioned on the object side of the third lens unit L3 in the optical axis direction. In the zoom lens of the fifth embodiment illustrated in FIGS. 9A to 9C, intervals among the lens units are changed as follows during zooming from the wide angle end to the zoom position at the telephoto end. Specifically, the lens units move so that the interval between the first lens unit L1 and the second lens unit L2 is increased, the interval between the second lens unit L2 and the third lens unit L3 is decreased, and the interval between the third lens unit L3 and the fourth lens unit L4 is decreased. Further, the lens units move so that the interval between the fourth lens unit L4 and the fifth lens unit L5 is increased.

In the zoom lens of the fifth embodiment illustrated in FIGS. 9A to 9C, the first lens unit L1, the third lens unit L3, and the fourth lens unit L4 are positioned closer to the object side at the telephoto end than at the wide angle end. In addition, the second lens unit L2 moves along a locus convex toward the image side, and the fifth lens unit L5 moves along a locus convex toward the object side. In the zoom lens of the fifth embodiment illustrated in FIGS. 9A to 9C, the F number decision member SP is positioned on the object side of the third lens unit L3 in the optical axis direction. In the zoom lens of the fifth embodiment illustrated in FIGS. 9A to 9C, the interval between the third lens unit L3 and the fourth lens unit L4 is set larger at the telephoto end than at the wide angle end, and hence higher zooming effect is obtained.

In each embodiment, with the structure described above, a high zoom ratio is realized while the total lens length is decreased at the wide angle end and at the telephoto end. Note that, in each embodiment, any lens unit may be moved to have a component in the direction perpendicular to the optical axis so that an image position is moved for correcting camera shake.

Next, a lens structure of each lens unit is described. The first lens unit L1 includes, in order from the object side to the image side, a cemented lens 14 constituted of a negative lens 11 (having negative refractive power) and a positive lens 12 (having positive refractive power), and a positive lens 13 having a meniscus shape with a convex surface facing the object side. In each embodiment, in order to obtain a small zoom lens having a high zoom ratio, the refractive power of the first lens unit L1 is enhanced to some extent. In this case, various aberrations are increased in the first lens unit L1. In particular, large spherical aberration is generated on the telephoto side. In each embodiment, the positive refractive power of the first lens unit L1 is shared by the cemented lens 14 and the positive lens 13 so as to reduce generation of the various aberrations.

Further, a low-dispersion material having an Abbe number larger than 80 is used for the positive lens 12. Thus, longitudinal chromatic aberration and lateral chromatic aberration are corrected appropriately on the telephoto side. Note that, the low dispersion effect of the positive lens 12 is enhanced by increasing the refractive power to some extent. It is preferred to use a material having a high refractive index for the positive lens of the first lens unit L1 in view of correcting spherical aberration on the telephoto side. In general, a low-dispersion material has a small refractive index. Therefore, if the positive lens 12 is made of a low-dispersion material, the refractive index cannot be increased. Therefore, in the zoom lens of each embodiment, a material having a higher refractive power than a material of the positive lens 12 is used for the positive lens 13, and hence generation of spherical aberration is reduced on the telephoto side. With the above-mentioned lens structure of the first lens unit L1, chromatic aberration is corrected appropriately on the telephoto side while securing a high zoom ratio.

The second lens unit L2 includes, in order from the object side to the image side, a negative lens 21 having a concave surface facing the image side, a negative lens 22, and a positive lens 23 having a convex surface facing the object side, in which the absolute value of refractive power of the lens surface on the image side is larger than that on the object side. In each embodiment, the refractive power of the second lens unit L2 is enhanced to some extent in order to realize downsizing of the first lens unit L1 while obtaining a wide field angle at the wide angle end. In this case, various aberrations are increased in the second lens unit L2. In particular, large field curvature is generated on the wide angle side, and large spherical aberration is generated on the telephoto side. Therefore, in each embodiment, the negative refractive power of the second lens unit L2 is shared by two negative lenses so as to reduce generation of the various aberrations. With this lens structure, downsizing and high performance of the front lens are realized while realizing a wide angle.

Further, a high-dispersion material having an Abbe number smaller than 18.4 is used for the positive lens 23 so that the refractive power of each lens of the second lens unit L2 necessary for achromatization is reduced as much as possible. Thus, the number of lenses of the second lens unit L2 is reduced so that downsizing of the entire system of the zoom lens is realized. In addition, a high-dispersion material is used for the positive lens 23, and hence a variation of lateral chromatic aberration from the wide angle end to the telephoto end is reduced. With the above-mentioned lens structure of the second lens unit L2, downsizing of the entire system of the zoom lens and correction of chromatic aberration are performed appropriately while increasing refractive power of the second lens unit L2. In particular, if the second lens unit L2 is downsized, the interval between the first lens unit L1 and the aperture stop SP is reduced so that downsizing of the front lens diameter is facilitated. The third lens unit L3 of each of the first to fourth embodiments illustrated in FIGS. 1A to 1C, 3A to 3C, 5A to 5C, and 7A to 7C, respectively, includes, in order from the object side to the image side, a positive lens 31 having a convex surface facing the object side, a negative lens 32 having a concave surface facing the image side, and a positive lens 33.

In each embodiment, the refractive power of the third lens unit L3 is enhanced to some extent in order to enhance the zooming effect of the third lens unit L3 and to reduce the total lens length at the wide angle end. In this case, various aberrations are increased in the third lens unit L3. In particular, large spherical aberration, coma aberration, and longitudinal chromatic aberration are generated in the entire zoom range. Therefore, in each embodiment, the positive refractive power of the third lens unit L3 is shared by two positive lenses so as to reduce generation of the various aberrations. In each embodiment, the third lens unit L3 is constituted of two positive lenses and one negative lens.

The third lens unit L3 of the fifth embodiment illustrated in FIGS. 9A to 9C includes, in order from the object side to the image side, a positive lens 31 having a convex surface facing the object side, and a negative lens 32 having a concave surface facing the image side. In the fifth embodiment illustrated in FIGS. 9A to 9C, the positive refractive power of the third lens unit L3 is weakened by using the positive refractive power of the fourth lens unit L4. Thus, in the fifth embodiment illustrated in FIGS. 9A to 9C, one positive lens is included in the third lens unit L3. The fourth lens unit L4 of the first, third, or fourth embodiment illustrated in FIGS. 1A to 1C, 5A to 5C, or 7A to 7C, respectively, is constituted of only a negative lens 41. In each embodiment, the fourth lens unit L4 is constituted of a small number of lenses so as to achieve a thin profile and light weight. The fourth lens unit L4 of the second embodiment illustrated in FIGS. 3A to 3C is constituted of a cemented lens 413 in which a positive lens 411 and a negative lens 412 are cemented to each other. Thus, a variation of chromatic aberration during zooming is reduced even if the refractive power is enhanced. The fourth lens unit L4 of the fifth embodiment illustrated in FIGS. 9A to 9C is constituted of only a positive lens 421. In each embodiment, the fourth lens unit is constituted of a small number of lenses so as to achieve a thin profile and light weight.

The fifth lens unit L5 of the first, third, fourth, or fifth embodiment illustrated in FIGS. 1A to 1C, 5A to 5C, 7A to 7C, or 9A to 9C, respectively, includes, in order from the object side to the image side, a cemented lens 53 constituted of a positive lens 51 and a negative lens 52. By adopting the cemented lens, generation of lateral chromatic aberration can be reduced appropriately over the entire zooming region even if the refractive power of each lens unit is enhanced to some extent.

Next, Numerical Embodiments corresponding to the embodiments of the present invention are described. In each Numerical Embodiment, i denotes an order of an optical surface from the object side. In each Numerical Embodiment, ri denotes a curvature radius of the i-th lens surface counted from the object side. Symbol di denotes i-th lens thickness and air distance counted from the object side. Symbols ndi and vdi respectively denote a refractive index and an Abbe number of the i-th material glass counted from the object side with respect to the d-line. In each Numerical Embodiment, the last two surfaces indicate the optical glass block surface of a filter or a faceplate. An aspheric shape is expressed by Equation 1 below:

$$X = \frac{(1/R)H^2}{1 + \sqrt{1 - (1+K)(H/R)^2}} + A4 \times H^4 + A6 \times H^6 + A8 \times H^8 + A10 \times H^{10}$$

Equation 1 where the X axis corresponds to the optical axis direction, the H axis corresponds to the direction perpendicular to the optical axis, the light propagation direction is positive, R denotes a paraxial curvature radius, K denotes a conic constant, and A4, A6, A8, and A10 denote aspheric coefficients, respectively. In addition, [e+X] means [×10$^{+x}$], and [e−X] means [×10$^{-x}$]. BF is obtained by air conversion of a distance between a lens end surface and a paraxial image plane (back focus). The total lens length is a distance between a lens front surface and the lens end surface plus the back focus BF. The aspheric surface is indicated by adding * as a suffix to surface number. A relationship among conditional expressions described above and various numerical values in Numerical Embodiments is shown in Table 1.

Numerical Embodiment 1
Unit: mm

Surface data

| Surface No. | r | d | nd | vd |
|---|---|---|---|---|
| 1 | 47.198 | 0.90 | 1.84666 | 23.9 |
| 2 | 28.488 | 2.50 | 1.49700 | 81.5 |
| 3 | 539.546 | 0.20 | | |
| 4 | 27.858 | 1.95 | 1.69680 | 55.5 |
| 5 | 130.634 | (Variable) | | |
| 6 | −142.993 | 1.03 | 1.85135 | 40.1 |
| 7* | 5.724 | 2.27 | | |
| 8 | −32.718 | 0.60 | 1.80400 | 46.6 |
| 9 | 20.754 | 0.20 | | |
| 10 | 10.630 | 1.40 | 1.94595 | 18.0 |
| 11 | 41.156 | (Variable) | | |
| 12* | 7.790 | 1.40 | 1.58313 | 59.4 |
| 13* | −42.498 | 0.92 | | |
| 14 (Stop) | ∞ | 1.48 | | |
| 15 | 14.621 | 0.60 | 1.94595 | 18.0 |
| 16 | 7.752 | 0.51 | | |
| 17 | 38.232 | 1.45 | 1.60311 | 60.6 |
| 18 | −10.112 | (Variable) | | |
| 19 | −22.588 | 0.50 | 1.48749 | 70.2 |
| 20 | 23.874 | (Variable) | | |
| 21 | 15.072 | 2.00 | 1.69680 | 55.5 |
| 22 | −42.895 | 0.60 | 1.72825 | 28.5 |
| 23 | 240.459 | (Variable) | | |
| 24 | ∞ | 0.80 | 1.51633 | 64.1 |
| 25 | ∞ | 0.90 | | |
| Image plane | ∞ | | | |

Aspherical surface data

Seventh Surface

K = −1.12918e+000   A4 = 7.09263e−004   A6 = 1.64697e−005
A8 = −3.81294e−007  A10 = 1.79401e−008

Twelfth surface

K = −1.22101e+000   A4 = 4.95648e−005   A6 = 7.55352e−006
A8 = 3.03893e−006   A10 = −1.83896e−007

Thirteenth surface

K = −1.36363e+002   A4 = 9.00236e−007   A6 = 2.00697e−005
A8 = 2.20070e−006   A10 = −1.36759e−007

Various data
Zoom ratio 13.32

| | Wide angle | Intermediate | Telephoto |
|---|---|---|---|
| Focal length | 5.12 | 17.53 | 68.25 |
| F number | 3.21 | 4.62 | 6.08 |
| Half field angle | 33.04 | 12.46 | 3.25 |
| Image height | 3.33 | 3.88 | 3.88 |
| Total lens length | 48.61 | 56.13 | 75.70 |
| BF | 6.95 | 13.90 | 7.26 |
| d5 | 0.95 | 11.54 | 25.33 |
| d11 | 15.79 | 4.21 | 0.71 |
| d18 | 1.90 | 2.57 | 3.04 |
| d20 | 2.51 | 3.39 | 18.85 |
| d23 | 5.52 | 12.48 | 5.84 |

-continued

Numerical Embodiment 1
Unit: mm

Zoom lens unit data

| Unit | First surface | Focal length |
|---|---|---|
| 1 | 1 | 41.07 |
| 2 | 6 | −6.74 |
| 3 | 12 | 10.27 |
| 4 | 19 | −23.73 |
| 5 | 21 | 23.41 |
| 6 | 24 | ∞ |

Numerical Embodiment 2
Unit: mm

Surface data

| Surface No. | r | d | nd | vd |
|---|---|---|---|---|
| 1 | 40.508 | 1.10 | 1.84666 | 23.9 |
| 2 | 26.505 | 2.85 | 1.49700 | 81.5 |
| 3 | 117.405 | 0.20 | | |
| 4 | 28.036 | 2.30 | 1.69680 | 55.5 |
| 5 | 115.344 | (Variable) | | |
| 6 | 496.060 | 0.80 | 1.83481 | 42.7 |
| 7 | 6.978 | 3.11 | | |
| 8 | −19.492 | 0.65 | 1.69680 | 55.5 |
| 9 | 27.002 | 0.95 | | |
| 10 | 17.132 | 1.30 | 1.94595 | 18.0 |
| 11 | 86.758 | (Variable) | | |
| 12 (Stop) | ∞ | 1.10 | | |
| 13* | 6.129 | 2.60 | 1.55332 | 71.7 |
| 14* | −19.640 | 1.44 | | |
| 15 | 30.262 | 0.70 | 1.80610 | 33.3 |
| 16 | 5.458 | 0.36 | | |
| 17 | 7.690 | 2.20 | 1.48749 | 70.2 |
| 18 | 43.575 | (Variable) | | |
| 19 | 16.720 | 2.50 | 1.65844 | 50.9 |
| 20 | −30.217 | 0.80 | 1.84666 | 23.9 |
| 21 | −745.365 | (Variable) | | |
| 22 | ∞ | 0.80 | 1.51633 | 64.1 |
| 23 | ∞ | 0.23 | | |
| Image plane | ∞ | | | |

Aspherical surface data

Thirteenth surface

K = 8.82654e−002   A4 = −3.72261e−004   A6 = −6.26683e−006
A8 = 7.60386e−007   A10 = −1.17611e−008

Fourteenth surface

K = −1.54914e+001   A4 = 1.11231e−004   A6 = 9.16897e−006
A8 = 4.07239e−007   A10 = 2.20754e−008

Various data
Zoom ratio 11.41

| | Wide angle | Intermediate | Telephoto |
|---|---|---|---|
| Focal length | 5.13 | 27.84 | 58.49 |
| F number | 3.43 | 4.75 | 5.72 |
| Half field angle | 33.64 | 7.92 | 3.79 |
| Image height | 3.41 | 3.88 | 3.88 |
| Total lens length | 58.03 | 68.24 | 80.67 |
| BF | 5.83 | 14.87 | 8.72 |
| d5 | 0.85 | 19.50 | 26.21 |
| d11 | 20.70 | 3.30 | 1.55 |

-continued

Numerical Embodiment 2
Unit: mm

| | | | |
|---|---|---|---|
| d18 | 5.69 | 5.62 | 19.24 |
| d21 | 4.90 | 13.94 | 7.79 |

Zoom lens unit data

| Unit | First surface | Focal length |
|---|---|---|
| 1 | 1 | 44.91 |
| 2 | 6 | −7.55 |
| 3 | 12 | 13.79 |
| 4 | 19 | 28.92 |
| 5 | 22 | ∞ |

Numerical Embodiment 3
Unit: mm

Surface data

| Surface No. | r | d | nd | vd |
|---|---|---|---|---|
| 1 | 46.369 | 0.90 | 1.84666 | 23.9 |
| 2 | 27.571 | 2.50 | 1.43875 | 94.9 |
| 3 | 559.981 | 0.20 | | |
| 4 | 30.024 | 1.95 | 1.77250 | 49.6 |
| 5 | 181.678 | (Variable) | | |
| 6 | 1208.784 | 1.03 | 1.85135 | 40.1 |
| 7* | 5.930 | 2.52 | | |
| 8 | −37.450 | 0.60 | 1.80400 | 46.6 |
| 9 | 24.691 | 0.20 | | |
| 10 | 10.171 | 1.00 | 2.15000 | 15.0 |
| 11 | 18.413 | (Variable) | | |
| 12* | 7.811 | 1.40 | 1.58313 | 59.4 |
| 13* | −47.243 | 0.92 | | |
| 14 (Stop) | ∞ | 1.48 | | |
| 15 | 14.957 | 0.60 | 1.94595 | 18.0 |
| 16 | 7.736 | 0.51 | | |
| 17 | 30.949 | 1.45 | 1.60311 | 60.6 |
| 18 | −9.935 | (Variable) | | |
| 19 | −22.814 | 0.50 | 1.48749 | 70.2 |
| 20 | 27.914 | (Variable) | | |
| 21 | 14.636 | 2.00 | 1.69680 | 55.5 |
| 22 | −213.155 | 0.60 | 1.72825 | 28.5 |
| 23 | 80.738 | (Variable) | | |
| 24 | ∞ | 0.80 | 1.51633 | 64.1 |
| 25 | ∞ | 0.90 | | |
| Image plane | ∞ | | | |

Aspherical surface data

Seventh Surface

K = −1.06717e+000   A4 = 6.59232e−004   A6 = 1.99244e−005
A8 = −6.18757e−007   A10 = 2.60294e−008

Twelfth surface

K = −1.58528e+000   A4 = 6.04929e−005   A6 = 3.14605e−006
A8 = 4.09286e−006   A10 = −3.60415e−007

Thirteenth surface

K = −1.45184e+002   A4 = −4.52161e−005   A6 = 1.30432e−005
A8 = 3.34384e−006   A10 = −3.15471e−007

Various data
Zoom ratio 13.82

| | Wide angle | Intermediate | Telephoto |
|---|---|---|---|
| Focal length | 4.96 | 16.36 | 68.60 |
| F number | 3.36 | 4.65 | 6.09 |

Numerical Embodiment 3
Unit: mm

| | | | |
|---|---|---|---|
| Half field angle | 33.88 | 13.33 | 3.23 |
| Image height | 3.33 | 3.88 | 3.88 |
| Total lens length | 48.67 | 55.53 | 74.48 |
| BF | 6.49 | 13.36 | 7.17 |
| d5 | 0.80 | 10.94 | 25.72 |
| d11 | 16.55 | 4.87 | 0.47 |
| d18 | 1.90 | 1.84 | 2.50 |
| d20 | 2.57 | 4.15 | 18.26 |
| d23 | 5.06 | 11.93 | 5.75 |

Zoom lens unit data

| Unit | First surface | Focal length |
|---|---|---|
| 1 | 1 | 41.50 |
| 2 | 6 | −6.86 |
| 3 | 12 | 10.21 |
| 4 | 19 | −25.67 |
| 5 | 21 | 25.57 |
| 6 | 24 | ∞ |

Numerical Embodiment 4
Unit: mm

Surface data

| Surface No. | r | d | nd | vd |
|---|---|---|---|---|
| 1 | 40.829 | 0.90 | 1.84666 | 23.9 |
| 2 | 28.443 | 2.80 | 1.45600 | 90.3 |
| 3 | −111.369 | 0.20 | | |
| 4 | 28.907 | 1.60 | 1.60311 | 60.6 |
| 5 | 74.324 | (Variable) | | |
| 6 | −62.226 | 1.03 | 1.85135 | 40.1 |
| 7* | 6.063 | 2.28 | | |
| 8 | −23.222 | 0.60 | 1.80400 | 46.6 |
| 9 | 28.259 | 0.20 | | |
| 10 | 12.482 | 1.40 | 2.14352 | 17.8 |
| 11 | 41.723 | (Variable) | | |
| 12* | 7.730 | 1.40 | 1.58313 | 59.4 |
| 13* | −44.307 | 0.92 | | |
| 14 (Stop) | ∞ | 1.48 | | |
| 15 | 14.928 | 0.60 | 1.94595 | 18.0 |
| 16 | 7.828 | 0.51 | | |
| 17 | 44.931 | 1.45 | 1.60311 | 60.6 |
| 18 | −10.044 | (Variable) | | |
| 19 | −20.840 | 0.50 | 1.48749 | 70.2 |
| 20 | 39.734 | (Variable) | | |
| 21 | 15.540 | 2.00 | 1.69680 | 55.5 |
| 22 | −31.360 | 0.60 | 1.72825 | 28.5 |
| 23 | −2306.962 | (Variable) | | |
| 24 | ∞ | 0.80 | 1.51633 | 64.1 |
| 25 | ∞ | 0.90 | | |
| Image plane | ∞ | | | |

Aspherical surface data

Seventh Surface

K = −8.76488e−001  A4 = 4.28897e−004  A6 = 1.21461e−005
A8 = −2.23456e−007  A10 = 7.87605e−009

Twelfth surface

K = −1.39680e+000  A4 = 2.06320e−004  A6 = 1.68052e−005
A8 = 1.98340e−006  A10 = −1.05023e−007

Thirteenth surface

K = −1.22659e+002  A4 = 1.72540e−004  A6 = 2.21046e−005
A8 = 2.00595e−006  A10 = −9.89895e−008

Various data
Zoom ratio 13.54

| | Wide angle | Intermediate | Telephoto |
|---|---|---|---|
| Focal length | 5.07 | 14.88 | 68.60 |
| F number | 3.37 | 4.32 | 6.09 |
| Half field angle | 33.33 | 14.60 | 3.23 |
| Image height | 3.33 | 3.88 | 3.88 |
| Total lens length | 49.91 | 56.87 | 77.21 |
| BF | 5.73 | 12.88 | 7.79 |
| d5 | 1.20 | 10.84 | 25.80 |
| d11 | 16.27 | 5.10 | 0.28 |
| d18 | 1.90 | 1.12 | 3.26 |
| d20 | 4.34 | 6.46 | 19.60 |
| d23 | 4.30 | 11.46 | 6.36 |

Zoom lens unit data

| Unit | First surface | Focal length |
|---|---|---|
| 1 | 1 | 42.00 |
| 2 | 6 | −6.67 |
| 3 | 12 | 10.41 |
| 4 | 19 | −27.97 |
| 5 | 21 | 22.63 |
| 6 | 24 | ∞ |

Numerical Embodiment 5
Unit: mm

Surface data

| Surface No. | r | d | nd | vd |
|---|---|---|---|---|
| 1 | 41.069 | 1.10 | 1.84666 | 23.9 |
| 2 | 26.300 | 2.85 | 1.49700 | 81.5 |
| 3 | 121.593 | 0.20 | | |
| 4 | 26.171 | 2.30 | 1.69680 | 55.5 |
| 5 | 94.129 | (Variable) | | |
| 6 | 110.635 | 0.80 | 1.83481 | 42.7 |
| 7 | 6.355 | 3.11 | | |
| 8 | −15.251 | 0.65 | 1.69680 | 55.5 |
| 9 | 65.380 | 0.95 | | |
| 10 | 17.018 | 1.30 | 2.00000 | 16.0 |
| 11 | 53.947 | (Variable) | | |
| 12 (Stop) | ∞ | 1.10 | | |
| 13* | 6.428 | 2.60 | 1.55332 | 71.7 |
| 14* | −16.276 | 1.44 | | |
| 15 | 43.996 | 0.70 | 1.80610 | 33.3 |
| 16 | 6.230 | (Variable) | | |
| 17 | 11.376 | 2.20 | 1.48749 | 70.2 |
| 18 | −380.889 | (Variable) | | |
| 19 | 19.187 | 2.50 | 1.65844 | 50.9 |
| 20 | −19.742 | 0.80 | 1.84666 | 23.9 |
| 21 | −109.516 | (Variable) | | |
| 22 | ∞ | 0.80 | 1.51633 | 64.1 |
| 23 | ∞ | 0.40 | | |
| Image plane | ∞ | | | |

-continued

Numerical Embodiment 5
Unit: mm

Aspherical surface data

Thirteenth surface

K = −7.75765e−002   A4 = −3.85283e−004   A6 = 5.74360e−006
A8 = −6.92005e−007  A10 = 8.51546e−008

Fourteenth surface

K = −9.64194e+000   A4 = −2.31393e−005   A6 = 1.79539e−005
A8 = −9.53438e−007  A10 = 1.11464e−007

Various data
Zoom ratio 12.27

|  | Wide angle | Intermediate | Telephoto |
| --- | --- | --- | --- |
| Focal length | 5.13 | 27.56 | 63.00 |
| F number | 3.50 | 4.63 | 5.97 |
| Half field angle | 33.59 | 8.00 | 3.52 |
| Image height | 3.41 | 3.88 | 3.88 |
| Total lens length | 60.48 | 70.69 | 83.12 |
| BF | 6.14 | 15.43 | 8.28 |
| d5 | 0.85 | 19.50 | 26.21 |
| d11 | 20.70 | 3.30 | 1.55 |
| d16 | 2.50 | 1.50 | 0.50 |
| d18 | 5.69 | 6.37 | 21.98 |
| d21 | 5.21 | 14.50 | 7.36 |

Zoom lens unit data

| Unit | First surface | Focal length |
| --- | --- | --- |
| 1 | 1 | 44.45 |
| 2 | 6 | −7.29 |
| 3 | 12 | 22.27 |
| 4 | 17 | 22.70 |
| 5 | 19 | 30.75 |
| 6 | 22 | ∞ |

TABLE 1

| | Numerical Embodiment | | | | |
| --- | --- | --- | --- | --- | --- |
| | 1 | 2 | 3 | 4 | 5 |
| Conditional Expression (1) | 81.5 | 81.5 | 94.9 | 90.3 | 81.5 |
| Conditional Expression (2) | 1.471 | 1.518 | 1.590 | 1.190 | 1.504 |
| Conditional Expression (3) | 18.0 | 18.0 | 15.0 | 17.8 | 16.0 |
| Conditional Expression (4) | 1.94595 | 1.94595 | 2.15000 | 2.14352 | 2.00000 |
| Conditional Expression (5) | −5.287 | −4.418 | −5.199 | −5.386 | −4.410 |
| Conditional Expression (6) | −3.472 | −3.207 | −3.419 | −3.687 | −3.202 |
| Conditional Expression (7) | 8.017 | 8.763 | 8.360 | 8.287 | 8.658 |
| Conditional Expression (8) | 1.315 | 1.472 | 1.382 | 1.315 | 1.421 |
| Conditional Expression (9) | 2.004 | 2.692 | 2.056 | 2.054 | 4.339 |

TABLE 1-continued

| | Numerical Embodiment | | | | |
| --- | --- | --- | --- | --- | --- |
| | 1 | 2 | 3 | 4 | 5 |
| Conditional Expression (10) | 0.200 | 0.200 | 0.334 | 0.106 | 0.200 |
| Conditional Expression (11) | 0.600 | 0.919 | 0.669 | 0.608 | 0.917 |
| Conditional Expression (12) | 0.031 | 0.032 | 0.042 | 0.031 | 0.039 |

Next, an embodiment of a digital still camera in which the zoom lens described above in each embodiment is used as an image taking optical system is described with reference to FIG. 11. In FIG. 11, the digital still camera includes a camera main body 20 and an image taking optical system 21 constituted of any one of the zoom lenses described above in the first to fifth embodiments. The digital still camera also includes a solid-state image pickup element (photoelectric transducer) 22 such as a CCD sensor or a CMOS sensor incorporated in the camera main body, for receiving light of an image of a subject formed by the image taking optical system 21. The digital still camera also includes a memory 23 for recording information corresponding to the image of the subject, after photoelectric conversion performed by the solid-state image pickup element 22. The digital still camera also includes a finder 24 constituted of a liquid crystal display panel or the like, for observing the image of the subject formed on the solid-state image pickup element 22. In this way, by applying the zoom lens of the present invention to an image pickup apparatus such as the digital still camera, a small image pickup apparatus having high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-294302, filed Dec. 25, 2009, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having the positive refractive power; and
a rear group including at least one lens unit,
wherein with respect to a wide angle end, at a telephoto end, an interval between the first lens unit and the second lens unit increases, an interval between the second lens unit and the third lens unit decreases, and an interval between the third lens unit and the rear group changes,
wherein the first lens unit includes two positive lenses and one negative lens, and the second lens unit includes a negative lens and a positive lens, and
wherein the following conditional expressions are satisfied:

$$80.0 < \nu 1p;$$

$$1.0 < f1p/f1 < 1.6;$$

$$\nu 2p < 18.4;$$

$1.90 < N2p$; and $-6.5 < M1/fw < -4.0$, where ν1p denotes an Abbe number of a material of one of the two positive lenses constituting the first lens unit that has a largest Abbe number, N2p and ν2p denote a refractive index and an Abbe number of a material of the positive lens of the second lens unit, respectively, f1 denotes a focal length of the first lens unit, f1p denotes a focal length of the one of the two positive lenses constituting the first lens unit that has the largest Abbe number, M1 denotes a movement amount of the first lens unit during zooming from the wide angle end to the telephoto end, and fw denotes a focal length of the entire system of the zoom lens at the wide angle end.

2. A zoom lens according to claim 1, wherein the following conditional expression is satisfied:

$-3.8 < M3/fw < -3.0$, where M3 denotes a movement amount of the third lens unit during zooming from the wide angle end to the telephoto end.

3. A zoom lens according to claim 1, wherein the following conditional expression is satisfied:

$7.0 < f1/fw < 10.0$.

4. A zoom lens according to claim 1, wherein the following conditional expression is satisfied:

$1.2 < |f2|/fw < 1.6$, where f2 denotes a focal length of the second lens unit.

5. A zoom lens according to claim 1, wherein the following conditional expression is satisfied:

$1.7 < f3/fw < 4.6$, where f3 denotes a focal length of the third lens unit.

6. A zoom lens according to claim 1, wherein the following conditional expression is satisfied:

$0.1 < \Delta N1p < 0.4$, where ΔN1p denotes a difference in refractive index between materials of the two positive lenses constituting the first lens unit.

7. A zoom lens according to claim 1, wherein:
the second lens unit includes, in order from the object side to the image side, the negative lens having a concave surface facing the image side, with an absolute value of refractive power of a lens surface on the image side larger than that on the object side, and the positive lens having a convex surface facing the object side; and
the following conditional expression is satisfied:

$0.56 < d2/fw < 0.95$, where d2 denotes a distance on an optical axis between the lens surface of the negative lens on the image side and the lens surface of the positive lens on the object side.

8. A zoom lens according to claim 1, wherein the following conditional expression is satisfied:

$0.029 < (1/\nu 2p - 1/\nu 2n) < 0.050$, where ν2n denotes an Abbe number of a material of the negative lens that constitutes the second lens unit that has a largest absolute value of refractive power.

9. An image pickup apparatus comprising:
the zoom lens according to claim 1; and
an image pickup element for receiving light of an image formed by the zoom lens.

10. A zoom lens comprising, in order from an object side to an image side:
a first lens unit having a positive refractive power;
a second lens unit having a negative refractive power;
a third lens unit having the positive refractive power; and
a rear group including at least one lens unit,
wherein with respect to a wide angle end, at a telephoto end, an interval between the first lens unit and the second lens unit increases, an interval between the second lens unit and the third lens unit decreases, and an interval between the third lens unit and the rear group changes,
wherein the first lens unit includes two positive lenses and one negative lens, and the second lens unit includes a negative lens and a positive lens, and
wherein the following conditional expressions are satisfied:

$80.0 < \nu 1p$;

$1.0 < f1p/f1 < 1.6$;

$\nu 2p < 18.4$;

$1.90 < N2p$; and $-3.8 < M3/fw < -3.0$, where ν1p denotes an Abbe number of a material of one of the two positive lenses constituting the first lens unit that has a largest Abbe number, N2p and ν2p denote a refractive index and an Abbe number of a material of the positive lens of the second lens unit, respectively, f1 denotes a focal length of the first lens unit, f1p denotes a focal length of the one of the two positive lenses constituting the first lens unit that has the largest Abbe number, M3 denotes a movement amount of the third lens unit during zooming from the wide angle end to the telephoto end, and fw denotes a focal length of the entire system of the zoom lens at the wide angle end.

11. An image pickup apparatus comprising:
the zoom lens according to claim 10; and
an image pickup element for receiving light of an image formed by the zoom lens.

12. A zoom lens comprising, in order from an object side to an image side:
a first lens unit having a positive refractive power;
a second lens unit having a negative refractive power;
a third lens unit having the positive refractive power; and
a rear group including at least one lens unit,
wherein with respect to a wide angle end, at a telephoto end, an interval between the first lens unit and the second lens unit increases, an interval between the second lens unit and the third lens unit decreases, and an interval between the third lens unit and the rear group changes,
wherein the first lens unit includes two positive lenses and one negative lens, and the second lens unit includes a negative lens and a positive lens, and
wherein the following conditional expressions are satisfied:

$80.0 < \nu 1p$;

$1.0 < f1p/f1 < 1.6$;

$\nu 2p < 18.4$;

$1.90 < N2p$; and $0.56 < d2/fw < 0.95$, where ν1p denotes an Abbe number of a material of one of the two positive lenses constituting the first lens unit that has a largest Abbe number, N2p and ν2p denote a refractive index and an Abbe number of a material of the positive lens of the second lens unit, respectively, f1 denotes a focal length of the first lens unit, f1p denotes a focal length of the one of the two positive lenses constituting the first lens unit that has the largest Abbe number, d2 denotes a distance on an optical axis between the lens surface of the negative lens constituting the second lens unit on the image side and the lens surface of the positive lens constituting the second lens unit on the object side, and fw denotes a focal length of the entire system of the zoom lens at the wide angle end.

13. An image pickup apparatus comprising:

the zoom lens according to claim 12; and an image pickup element for receiving light of an image formed by the zoom lens.

* * * * *